US007752266B2

(12) United States Patent
Grove

(10) Patent No.: US 7,752,266 B2
(45) Date of Patent: Jul. 6, 2010

(54) SYSTEM AND METHOD TO FACILITATE TRANSLATION OF COMMUNICATIONS BETWEEN ENTITIES OVER A NETWORK

(75) Inventor: Steve Grove, San Jose, CA (US)

(73) Assignee: eBay Inc., San Jose, CA (US)

( * ) Notice: Subject to any disclaimer, the term of this patent is extended or adjusted under 35 U.S.C. 154(b) by 804 days.

(21) Appl. No.: 09/976,301

(22) Filed: Oct. 11, 2001

(65) Prior Publication Data

US 2003/0074462 A1 Apr. 17, 2003

(51) Int. Cl.
G06F 15/16 (2006.01)
G06F 17/28 (2006.01)
G06F 3/00 (2006.01)

(52) U.S. Cl. .......................... 709/206; 704/4; 715/752

(58) Field of Classification Search ............... 704/1–10, 704/4; 345/171; 717/137, 135; 709/227–229, 709/204–207; 715/751–759
See application file for complete search history.

(56) References Cited

U.S. PATENT DOCUMENTS

| 3,573,747 | A | 4/1971 | Adams et al. |
|---|---|---|---|
| 3,581,072 | A | 5/1971 | Nymayer |
| 4,412,287 | A | 10/1983 | Braddock, III |
| 4,674,044 | A | 6/1987 | Kalmus et al. |
| 4,677,552 | A | 6/1987 | Sibley, Jr. |
| 4,789,928 | A | 12/1988 | Fujisaki |
| 4,799,156 | A | 1/1989 | Shavit et al. |
| 4,823,265 | A | 4/1989 | Nelson |
| 4,864,516 | A | 9/1989 | Gathier et al. |
| 4,903,201 | A | 2/1990 | Wagner |
| 5,063,507 | A | 11/1991 | Lindsey et al. |
| 5,063,523 | A | 11/1991 | Vrenjak |
| 5,077,665 | A | 12/1991 | Silverman et al. |
| 5,101,353 | A | 3/1992 | Lupien et al. |
| 5,136,501 | A | 8/1992 | Silverman et al. |
| 5,168,446 | A | 12/1992 | Wiseman |
| 5,205,200 | A | 4/1993 | Wright |
| 5,243,515 | A | 9/1993 | Lee |
| 5,258,908 | A | 11/1993 | Hartheimer et al. |

(Continued)

FOREIGN PATENT DOCUMENTS

CA 2253543 3/1997

(Continued)

OTHER PUBLICATIONS

International Searching Authority; "International Search Report"; PCT/US02/04692; Jun. 12, 2002.

(Continued)

Primary Examiner—David E England
(74) Attorney, Agent, or Firm—Schwegman, Lundberg & Woessner, P.A.

(57) ABSTRACT

A system and method to facilitate translation of communications between entities over a network are described. Multiple predetermined language constructs are communicated to a first entity as a first transmission over the network. Responsive to selection by the first entity of a language construct from the predetermined language constructs, a translated language construct corresponding to the selected language construct is identified. Finally, the translated language construct is communicated to a second entity as a second transmission over the network.

36 Claims, 9 Drawing Sheets

U.S. PATENT DOCUMENTS

| | | | |
|---|---|---|---|
| 5,280,422 A | 1/1994 | Moe et al. | |
| 5,297,031 A | 3/1994 | Gutterman et al. | |
| 5,297,032 A | 3/1994 | Trojan et al. | |
| 5,305,200 A | 4/1994 | Hartheimer et al. | |
| 5,325,297 A | 6/1994 | Bird et al. | |
| 5,329,589 A | 7/1994 | Fraser et al. | |
| 5,375,055 A | 12/1994 | Togher et al. | |
| 5,394,324 A | 2/1995 | Clearwater | |
| 5,418,949 A | 5/1995 | Suzuki | |
| 5,426,281 A | 6/1995 | Abecassis | |
| 5,442,782 A * | 8/1995 | Malatesta et al. | 707/4 |
| 5,485,510 A | 1/1996 | Colbert | |
| 5,497,319 A * | 3/1996 | Chong et al. | 704/2 |
| 5,535,403 A | 7/1996 | Li et al. | |
| 5,544,051 A | 8/1996 | Senn et al. | |
| 5,553,145 A | 9/1996 | Micali | |
| 5,557,728 A | 9/1996 | Garrett et al. | |
| 5,596,994 A | 1/1997 | Bro | |
| 5,598,557 A | 1/1997 | Doner et al. | |
| 5,600,833 A | 2/1997 | Senn et al. | |
| 5,640,569 A | 6/1997 | Miller et al. | |
| 5,652,896 A * | 7/1997 | Yamauchi et al. | 704/2 |
| 5,657,389 A | 8/1997 | Houvener | |
| 5,664,115 A | 9/1997 | Fraser | |
| 5,689,652 A | 11/1997 | Lupien et al. | |
| 5,694,546 A | 12/1997 | Reisman | |
| 5,706,457 A | 1/1998 | Dwyer et al. | |
| 5,710,889 A | 1/1998 | Clark et al. | |
| 5,715,314 A | 2/1998 | Payne et al. | |
| 5,715,402 A | 2/1998 | Popolo | |
| 5,717,989 A | 2/1998 | Tozzoli et al. | |
| 5,722,418 A | 3/1998 | Bro | |
| 5,724,524 A | 3/1998 | Hunt et al. | |
| 5,724,593 A | 3/1998 | Hargrave, III et al. | |
| 5,727,165 A | 3/1998 | Ordish et al. | |
| 5,758,126 A | 5/1998 | Daniels et al. | |
| 5,771,291 A | 6/1998 | Newton et al. | |
| 5,771,380 A | 6/1998 | Tanaka et al. | |
| 5,778,213 A * | 7/1998 | Shakib et al. | 703/27 |
| 5,790,790 A | 8/1998 | Smith et al. | |
| 5,794,219 A | 8/1998 | Brown | |
| 5,799,285 A | 8/1998 | Klingman | |
| 5,803,500 A | 9/1998 | Mossberg | |
| 5,818,914 A | 10/1998 | Fujisaki | |
| 5,826,244 A | 10/1998 | Huberman | |
| 5,835,896 A | 11/1998 | Fisher et al. | |
| 5,835,911 A | 11/1998 | Nakagawa et al. | |
| 5,845,265 A | 12/1998 | Woolston | |
| 5,845,266 A | 12/1998 | Lupien et al. | |
| 5,846,265 A | 12/1998 | McGregor et al. | |
| 5,850,442 A | 12/1998 | Muftic | |
| 5,854,997 A | 12/1998 | Sukeda et al. | |
| 5,857,188 A | 1/1999 | Douglas | |
| 5,857,201 A | 1/1999 | Write, Jr. et al. | |
| 5,857,203 A | 1/1999 | Kauffman et al. | |
| 5,872,848 A | 2/1999 | Romney et al. | |
| 5,873,069 A | 2/1999 | Reuhl et al. | |
| 5,884,056 A | 3/1999 | Steele | |
| 5,884,247 A * | 3/1999 | Christy | 704/7 |
| 5,890,138 A | 3/1999 | Godin et al. | |
| 5,905,974 A | 5/1999 | Fraser et al. | |
| 5,905,975 A | 5/1999 | Aussubel | |
| 5,909,544 A | 6/1999 | Anderson et al. | 395/200.38 |
| 5,922,074 A | 7/1999 | Richard et al. | |
| 5,924,072 A | 7/1999 | Havens | |
| 5,926,794 A | 7/1999 | Fethe | |
| 5,944,790 A | 8/1999 | Levy | |
| 5,874,412 A | 10/1999 | Hazelhurst et al. | |
| 5,966,685 A * | 10/1999 | Flanagan et al. | 704/8 |
| 5,991,739 A | 11/1999 | Cupps et al. | |
| 6,006,221 A | 12/1999 | Liddy et al. | |
| 6,018,742 A * | 1/2000 | Herbert, III | 707/102 |
| 6,035,288 A | 3/2000 | Solomon | |
| 6,035,402 A | 3/2000 | Vaeth et al. | |
| 6,044,363 A | 3/2000 | Mori et al. | |
| 6,047,264 A | 4/2000 | Fisher et al. | |
| 6,055,518 A | 4/2000 | Franklin et al. | |
| 6,058,379 A | 5/2000 | Odom et al. | |
| 6,058,417 A | 5/2000 | Hess et al. | |
| 6,061,448 A | 5/2000 | Smith et al. | |
| 6,073,117 A | 6/2000 | Oyanagi et al. | |
| 6,085,169 A | 7/2000 | Walker et al. | |
| 6,085,176 A | 7/2000 | Woolston | |
| 6,092,035 A | 7/2000 | Kurachi et al. | |
| 6,104,815 A | 8/2000 | Alcorn et al. | |
| 6,119,137 A | 9/2000 | Smith et al. | |
| 6,119,229 A | 9/2000 | Martinez et al. | |
| 6,134,533 A | 10/2000 | Shell | |
| 6,141,653 A | 10/2000 | Conklin et al. | |
| 6,144,984 A | 11/2000 | DeBenedictis et al. | |
| 6,151,589 A | 11/2000 | Aggarwal et al. | |
| 6,161,082 A | 12/2000 | Goldberg et al. | |
| 6,178,408 B1 | 1/2001 | Copple et al. | |
| 6,192,407 B1 | 2/2001 | Smith et al. | |
| 6,202,051 B1 | 3/2001 | Woolston | |
| 6,205,418 B1 * | 3/2001 | Li et al. | 704/8 |
| 6,226,412 B1 | 5/2001 | Schwab | |
| 6,243,691 B1 | 6/2001 | Fisher et al. | |
| 6,266,651 B1 | 7/2001 | Woolston | |
| 6,266,652 B1 | 7/2001 | Godin et al. | |
| 6,275,789 B1 * | 8/2001 | Moser et al. | 704/7 |
| 6,282,507 B1 * | 8/2001 | Horiguchi et al. | 704/3 |
| 6,292,769 B1 * | 9/2001 | Flanagan et al. | 704/3 |
| 6,301,554 B1 * | 10/2001 | Christy | 704/7 |
| 6,317,727 B1 | 11/2001 | May | |
| 6,326,985 B1 * | 12/2001 | Tazoe et al. | 715/764 |
| 6,336,105 B1 | 1/2002 | Conklin et al. | |
| 6,339,755 B1 * | 1/2002 | Hetherington et al. | 704/8 |
| 6,349,275 B1 * | 2/2002 | Schumacher et al. | 704/8 |
| 6,363,337 B1 * | 3/2002 | Amith | 704/7 |
| 6,389,427 B1 | 5/2002 | Faulkner | |
| 6,396,515 B1 * | 5/2002 | Hetherington et al. | 715/762 |
| 6,415,270 B1 | 7/2002 | Rackson et al. | |
| 6,421,653 B1 | 7/2002 | May | |
| 6,446,048 B1 | 9/2002 | Wells et al. | |
| 6,460,015 B1 * | 10/2002 | Hetherington et al. | 704/8 |
| 6,463,404 B1 * | 10/2002 | Appleby | 704/9 |
| 6,473,729 B1 * | 10/2002 | Gastaldo et al. | 704/4 |
| 6,493,661 B1 * | 12/2002 | White et al. | 704/8 |
| 6,507,813 B2 * | 1/2003 | Veditz et al. | 704/8 |
| 6,526,426 B1 | 2/2003 | Lakritz | |
| 6,567,821 B1 | 5/2003 | Polk | |
| 6,570,591 B1 * | 5/2003 | Crovetto et al. | 715/763 |
| 6,571,241 B1 * | 5/2003 | Nosohara | 707/6 |
| 6,574,239 B1 | 6/2003 | Dowling et al. | 370/469 |
| 6,598,026 B1 | 7/2003 | Ojha et al. | |
| 6,623,529 B1 | 9/2003 | Lakritz | |
| 6,647,373 B1 | 11/2003 | Carlton-Foss | |
| 6,721,715 B2 | 4/2004 | Nemzow | |
| 6,732,161 B1 | 5/2004 | Hess et al. | |
| 6,771,291 B1 | 8/2004 | DiStefano | |
| 6,799,165 B1 | 9/2004 | Boesjes | |
| 6,857,022 B1 * | 2/2005 | Scanlan | 709/229 |
| 6,901,408 B2 | 5/2005 | Fachat et al. | |
| 6,999,932 B1 | 2/2006 | Zhou | |
| 7,007,026 B2 | 2/2006 | Wilkinson et al. | |
| 7,013,289 B2 | 3/2006 | Horn et al. | |
| 7,076,453 B2 | 7/2006 | Jammes et al. | |
| 7,133,835 B1 | 11/2006 | Fusz et al. | |
| 7,136,863 B2 | 11/2006 | Wang | |
| 7,165,041 B1 | 1/2007 | Guheen et al. | |
| 7,191,393 B1 | 3/2007 | Chin et al. | |
| 7,234,110 B2 | 6/2007 | Sumitomo | |
| 7,315,826 B1 | 1/2008 | Guheen et al. | |

| | | |
|---|---|---|
| 7,340,389 B2 | 3/2008 | Vargas |
| 7,418,390 B1 | 8/2008 | Jokipii |
| 2001/0011241 A1 | 8/2001 | Nemzow |
| 2001/0029455 A1 | 10/2001 | Chin et al. |
| 2001/0039531 A1 | 11/2001 | Aoki |
| 2002/0029182 A1 | 3/2002 | Nakagawa |
| 2002/0042835 A1 | 4/2002 | Pepin et al. |
| 2002/0046137 A1 | 4/2002 | Odom et al. |
| 2002/0073111 A1 | 6/2002 | Heyliger |
| 2002/0082953 A1 | 6/2002 | Batham et al. |
| 2002/0082977 A1 | 6/2002 | Hammond et al. |
| 2002/0099562 A1 | 7/2002 | Bruce et al. |
| 2002/0123959 A1 | 9/2002 | Mozley et al. |
| 2003/0005159 A1 | 1/2003 | Kumhyr |
| 2003/0018885 A1 | 1/2003 | Landsman et al. |
| 2003/0055747 A1 | 3/2003 | Carr et al. |
| 2003/0083952 A1 | 5/2003 | Simpson et al. |
| 2003/0110047 A1 | 6/2003 | Santosuosso et al. |
| 2003/0139975 A1 | 7/2003 | Perkowski |
| 2003/0154134 A1 | 8/2003 | Wang |
| 2003/0167213 A1 | 9/2003 | Jammes et al. |
| 2005/0102151 A1 | 5/2005 | Fuwa et al. |
| 2005/0240392 A1 | 10/2005 | Munro et al. |
| 2006/0200353 A1* | 9/2006 | Bennett .................. 704/270.1 |
| 2007/0112643 A1 | 5/2007 | Veres et al. |

FOREIGN PATENT DOCUMENTS

| | | |
|---|---|---|
| CN | 1139782 | 1/1997 |
| FR | 2658635 A1 | 2/1991 |
| JP | 02207898 | 7/2002 |
| JP | 04-094643 | 3/2004 |
| NL | 9300266 | 2/1993 |
| WO | WO 92/15174 | 2/1992 |
| WO | WO95/17711 | 6/1995 |
| WO | WO 96/34356 | 4/1996 |
| WO | WO 97/37315 | 3/1997 |
| WO | WO99/63461 | 12/1999 |
| WO | WO-0058862 | 10/2000 |
| WO | WO-0157722 A1 | 8/2001 |
| WO | WO-0182115 | 11/2001 |
| WO | WO-03/038560 | 5/2003 |
| WO | WO-03038560 | 5/2003 |

OTHER PUBLICATIONS

Malone, T.W.; Yates, J; et al., "Electronic Markets and Electronic Hierarchies", *Communications—of the ACM*, Jun. 1987, pp. 484-497, vol. 30, No. 6.

Warbelow, A; Kokuryo, J, "Aucnet: TV Auction Network System". *Harvard Business School Case/Study*, Jul. 1989, pp. 1-15, HBVR# 9-190-001, USA.

"Personal Optimized Decision/Transaction Program", *IBM Technical Disclosure Bulletin*, Jan. 1995, pp. 83-84, vol. 38, No. 1.

Neo, B.S, "The implementation of an electronic market for pig trading in Singapore", *Journal of Strategic Information Systems*, Dec. 1992, pp. 278-288, vol. 1.

Rockoff, T.E; Groves, M., "Design of an Internet-based system for remote Dutch auctions", *Internet Research—Electronic Networking Applications and Policy*, Jan. 1, 1995, vol. 5, No. 4, pp. 10-16.

Massimb, M.N; Phelps, B.D, "Electronic Trading, Market Structure and Liquidity", *Financial Analysts Journal*, Jan.-Feb. 1994, vol. 50, No. 1, pp. 39-50.

Post, D.L; Coppinger, S.S, et al., "Application of Auctions as a Pricing Mechanism for the Interchange of Electric Power", *IEEE Transactions on Power Systems*, Aug. 1995, pp. 7, vol. 10, No. 3.

Hess, C.M; Kemerer, C.F., "Computerized Loan Organization System: An Industry Case Study of the Electronic Markets Hypothesis", *MIS Quarterly*, Sep. 1994, vol. 18, No. 3, pp. 251-274.

Reck, Martin, "Formally Specifying and Automated Trade Execution System", *Journal of Systems and Software*, 1993, pp. 245-252, vol. 21.

"Anonymous Delivery of Goods in Electronic Commerce", *IBM Technical Disclosure Bulletin*, Mar. 1996, pp. 363-366, vol. 39, No. 3.

Lee, Ho G., "Electronic Brokerage and Electronic Auction: The Impact of IT on Market Structures", *Proceedings of the 29th HICSS*, 1996, pp. 397-406, vol. IV.

Clemons, E; Weber, B., "Evaluating the Prospects for Alternative Electronic Securities Markets", *International Conference on Information Systems*, 1991, pp. 53-61, vol. 12.

Mardesich, J., "Onsale takes auction gavel electronic", *Computer Reseller News*, Jul. 8, 1996, p. 2 continued on p. 32.

"Onsale joins fray as online shopping picks up speed: Internet Booms", *Computer Reseller News*, Jun. 5, 1995, p. 73 (www.dialogweb.com).

Siegmann, Ken, "Nowhere to go but up", *PC Week*, Oct. 23, 1995, p. 1-3, vol. 12, No. 42 (www.dialogweb.com).

"Onsale: Onsale Brings Thrill of Auctions and Bargain Hunting Online; Unique Internet retail service debuts with week-long charity auction for the Computer Museum in Boston", May 24, 1995, (pp. 3) Dialog Web. 0489267 BW0022.

Schmid, B.F., "The Development of Electronic Commerce", *Newsletter of the Competence Centre Electronic Markets*, Oct. 1993, No. 9/10.

Tjostheim, I; Eide, J., "A case study of an on-line auction for the World Wide Web", Norwegian Computing Center, No Date Given, www/nr.no/gem/elcom/publikasjoner/enter98e.html.

Graham, I., "The Emergence of Linked Fish Markets in Europe", *Focus Theme*, No Date Given.

Reck, Martin, "Traing-Process Characteristics of Electronic Auctions", *Focus Theme*, No Date Given.

Van Heck, E.; Ribbers, P.M., "Experiences with Electronic Auctions in the Dutch Flower Industry", *Focus Theme*, No Date Given.

Lee, H.G., "Aucnet: Electronic Intermediary for Used-car Transactions", *Focus Theme*, No Date Given.

Klein, S., "Introduction to Electronic Auctions", *Focus Theme*, No Date Given.

Turban, E., "Auctions and Bidding on the Internet an Assessment", *Focus Theme*, No Date Given.

Zwass, Vladimir, "Electronic Commerce: Structures and Issues", *International Journal of Electronic Commerce*, Fall 1996, pp. 3-23, vol. 1, No. 1, pp. 3-23 (www.cba.bgsu.edu).

Priest, Chris; van Tol, Maarten, "Adaptive agents in a persistent shout double auction", Proceedings of the First International Conference on Information and Computation Economies, Oct. 25-28, 1998, Charleston, US.

Resnick, Paul; Zeckhauser, Richard; Friedman, Eric; Kuwabara, Ko, "Reputation Systems", Association for Computing Machinery, *Communications of the ACM*, vol. 43, No. 12, pp. 45-48 ((Dialog.

Meade, Jim, visual 360: a performance appraisal system that's "fun"., *HR Magazine*, Jul. 1999 (Dialog file).

Andale Overview, http://www.andale.com/corp/products/qs_overview.jsp, pp. 1-4, Dec. 18, 2002.

Andale Lister: Inventory Dashboard, http://www.andale.com/corp/products/qs_sell_details_invdashboard.jsp, pp. 1-2, Dec. 18, 2002.

Andale Lister: Bulk List, http://www.andale.com/corp/products/qs_sell_details_bulklist.jsp, p. 1, Dec. 18, 2002.

Andale Lister, http://www.andale.com/corp/products/sell.jsp, pp. 1-3, Dec. 18, 2002.

Andale Lister: Launch Scheduler, http://www.andale.com.corp.products/qs_sell_details_launchsched.jsp, pp. 1-2, Dec. 18, 2002.

Andale Lister: Design Center, http://www.andale.com/corp/products/qs_sell_details_designcenter.jsp, pp. 1-2, Dec. 18, 2002.

Andale Lister: Online or Offline, http://www.andale.com/corp/products/qs_sell_details_onoffline.jsp, pp. 1-2, Dec. 18, 2002.

Andale Lister: In-line Images, http://www.andale.com/corp/products/qs_sell_details_inlineimg.jsp, pp. 1-2, Dec. 18, 2002.

"International Search Report", PCT/US03/17915, (Nov. 26, 2003).
"International Search Report", *PCT/US00/17136*, (Jun. 21, 2000).
"International Search Report", *PCT/US01/23854*, (Jul. 24, 2001).
"International Search Report", *PCT/US99/18510*, (Aug. 12, 1999).
"International Search Report", *PCT/US01/12398*, (Apr. 16, 2001).
"International Search Report", *PCT/US01/04811*, (Feb. 14, 2001).
"International Search Report", *PCT/US99/29312*, (Dec. 8, 1999).
"International Search Report", *PCT/US00/32088*, (Nov. 20, 2000).
"International Search Report", *PCT/US01/02584*, (Jan. 26, 2001).

"Mediapraise", *Mediappraise receives national award for web-based technology that enables companies to solve thorn HR problem. Business Editors.*, (Dec. 14, 1998).

"Subasta.com Enters Into Strategic Partnership With From2.com", *Business Wire*, 06242815 Dialog File 20: see p. 1., (Jul. 16, 1999).

"Subasta.com The Premier Online Auction Board for Latin America, Spain, and the Hispanic Sector of the U.S., Has Attracted Over 60,000 Viewers in Less Than Two Months!", *Business Wire*, 06240372 Dialog File 20: see all pages., (Jul. 16, 1999).

"United Technologies: UTC's Carrier Corp. Teams With FreeMarkets to Create Largest Asian-based B2B Online Auction Market to Date; UTC Division Identifies Average Annual Savings of More Than 16 Percent on Electric Motors Through FreeMarkets B2B Marketplace", *M2 Presswire*, 10190474 Dialog File 20; see all pages., (Mar. 22, 2000).

"Yahoo! Auctions Celebrates One-Year Anniversary; As Online Aution Usage Continues to Grow, Yahoo! is Quickly Becoming the World Marketplace of the New Millennium.", *Business Wire*, 07211889 Dialog File 20: see all pages., (Sep. 14, 1999).

Akin, D , "Web Retailing Gains Market Muscle As Concerns Fade: Record Season: Increasing Number of Sites Catering for Canadian Dollar", *Financial Post*, 03856053 Dialog File 20: see all pages., (Dec. 26, 1998),7.

Merrill, Kevin , "GE Capital to Extend Integrator Buying Spree", *Computer Resell News*, http://www.crn.com, (Jul. 8, 1996),p. 31-32.

Baumann, G W., "Personal Optimized Decision/Transaction Program", *IBM Technical Disclosure Bulletin.*, (Jan. 1995), 83-84.

Business Wire, "Subasta.com Enters Into Strategic Partnership with From2.com", *Business Wire*, Obtained from Proquest, Document No. 43206061,(Jul. 16, 1999), 2 pages.

Business Wire, "Yahoo! Launches Three New European Auctions Services; Yahoo! Italy, Yahoo! Spain and Yahoo! Sweden Unveil New Local Auctions", *Business Wire*, Obtained from Proquest, Document No. 45061209,(Sep. 23, 1999),3 pages.

Cooper, C., et al., "Playing Catch-Up: U.S. Web Firms Get Slow Start in Europe, Amid Crowded Field—Used to Being First and Best at Home, They Stumble in World's No. 2 Market—Pouncing on Amazon Delays", *Wall Street Journal Europe*, Obtained from Proquest, Document No. 46338867,(Nov. 15, 1999),5 pages.

Pollick, M., "Sold! on eBay: As antique and collectible dealers see their sales increase through online auctions such as eBay, more of them are deciding that the internet is not something to be afraid of", *Sarasota Herald Tribune*, Obtained from Proquest, Document No. 45499060,(Oct. 11, 1999),8 pages.

PR Newswire Europe Ltd., "Mitsubishi Venture, Wells Fargo Partner to Offer Multi-Currency E-Commerce Storefront", *PR Newswire*, Obtained from Proquest, Document No. 39345965,(Mar. 1, 1999),3 pages.

Wilson, T., "Act Globally, Think Locally", *InternetWeek, Issue 789*, Obtained from Proquest, Document No. 46352181,(Nov. 15, 1999),4 p.

"International Search Report PCT/US00/17136", PCT/US00/17136.

"International Search Report PCT/US01/12398", PCT/US01/12398.

Schneider, G. M., et al., "An Introduction to Programming and Problem Solving with Pascal", *An Introduction to Programming and Problem Solving with Pascal, Second Edition*, John Wiley & Sons, Inc., New York,(1982),3 Pages.

"Hello direct store joins eBay network of merchants", *PR Newswire*, New York, NY, (May 23, 2002),1 pg.

"Mediappraise Receives National Award for Web-based Technology That Enables Companies to Solve Thorny HR Problem", *Business Wire Press Release*, (Dec. 15, 1998),1-2.

"Yahoo! Auctions Celebrates One-Year Anniversary; As Online Auction Usage Continues to Grow, Yahoo! Is Quickly Becoming the World Marketplace of the New Millennium", *Business Wire*, (Sep. 14, 1999),3 pages.

Akin, David, "Web retailing gains market muscle as concerns fade: Record season: Increasing number of sites catering for Canadian dollars" *Financial Post, p04*, (Dec. 26, 1998),3 pages.

Business Wire, "Subasta.com, the Premier Online Auction Board for Latin America, Spain, and the Hispanic Sector of the U.S., Has Attracted Over 60,000 Viewers in Less Than Two Months!", *Business Wire*, (Jul. 16, 1999),2 pages.

Grubbs, L., "Top 5 auction utilities", *PC World.com, San Francisco, CA*, (Dec. 4, 2000),1 pg.

M2 Presswire, "HP completes online strategy with launch of e-commerce site", Proquest#43225990,(Jun. 29, 1999), 3 pgs.

M2 Presswire, "United Technologies: UTC's Carrier Corp. teams with FreeMarkets to create largest Asian-based B2B online auction market to date; UTC Division identifies average annual savings of more than 16 percent on electric motors through FreeMarkets B2B eMarketpla", *M2 Presswire*, (Mar. 22, 2000),2 pages.

Merrill, Kevin, "GE Capital to extend integrator buying spree. (GE Capital Technology", *Computer Reseller News*, n691 , (Jul. 8, 1996),2(1).

"New eBay-like auction software released", *Business Wire*, Business Editors/High-Tech Writers; Business Wire; New York,(Mar. 17, 1999),2 pp.

"Yahoo Homepage", *Internet Archive Wayback Machine*, http://web.archive.org/web/19991003015603/http://www.yahoo.com/index.html,(Oct. 3, 1999),1 p.

"Yahoo!—Regional:Countries:Afghanistan", http://web.archive.org/web/20060921181441/http://dir.yahoo.com/Regional/countries/afghanistan, (Jun. 16, 1997).

"Yahoo!—Regional:Countries:Sweden", http://web.archive.org/web/19970616194441/www.yahoo.com/Regional/Countries/Sweden/, (Jun. 16, 1997).

*eBay:Internet Archive Wayback Machine*,www.archive.org;www.ebay.com; 07 , 12, (Oct. 1999),8 pgs.

"Subasta.com,the Premier Online Auction Board for Latin America, Spain, and the Hispanic Sector of the U.S., has Attracted Over 60,000 Viewers in Less than Two Months!", *Business Wire*, Proquest # 43203028,(Jul. 16, 1999),3pgs.

Tapscott, D. , "eBay endagners traditional papers auctioneer can pack far more punch in your sales pitch", *National Post*, Proquest# 54945579,(Oct. 9, 1999),3 pgs.

Wilson, D. , "Going . . . Going . . . Gone!Bargain-hunters and collectors can scour auctions from home via the Internet", *The Gazette*, Proquest #4116732,(Apr. 27, 1999),4 pgs.

Chinese office action issued Mar. 23, 2007 in Application No. 02824589, 16 pgs.

Ebay: Internet Archive Wayback Machine/www.archive.org, www.ebay.com, (Oct. 1999), 8 pgs.

McClenahen, John , Net Gains, Industry Week,Proquest # 41808971,(May 17, 1999), 8 pgs.

Pressler, Margaret , Sells on eBay; Housewife finds herself head of multinational software firm, Washington Post, Proquest # 44484325 (Sep. 5, 1999), 3 pgs.

www.thinclient.net., Accessed via www.archive.org on Feb. 26, 2008, (Jan. 22, 2004), 24 pgs.

"U.S. Appl. No. 09/602,110, Amendment filed Apr. 28, 2008", 17 pgs.

"U.S. Appl. No. 09/602,110, Final Office Action mailed Mar. 8, 2006", 11 pgs.

"U.S. Appl. No. 09/602,110, Final Office Action mailed Nov. 21, 2005", 11 pgs.

"U.S. Appl. No. 09/602,110, Non Final Office Action mailed Jan. 21, 2004", 13 pgs.

"U.S. Appl. No. 09/602,110, Non Final Office Action mailed Apr. 5, 2005", 11 pgs.

"U.S. Appl. No. 09/602,110, Non-Final Office Action mailed Jul. 21, 2008", 12 pgs.

"U.S. Appl. No. 09/602,110, Response filed Jan. 3, 2005 to Final Office Action mailed Sep. 2, 2004", 16 pgs.

"U.S. Appl. No. 09/602,110, Response filed Jan. 23, 2006 to Final Office Action mailed Nov. 21, 2005", 15 pgs.

"U.S. Appl. No. 09/602,110, Response filed May 8, 2006 to Final Office Action mailed Mar. 8, 2006", 17 pgs.

"U.S. Appl. No. 09/602,110, Response filed May 21, 2004 to Non-Final Office Action mailed Jan. 21, 2004", 18 pgs.

"U.S. Appl. No. 09/602,110, Advisory Action mailed May 26, 2006", 3 pgs.

"U.S. Appl. No. 09/602,110, Final Office Action mailed Sep. 2, 2004", 13 pgs.

"U.S. Appl. No. 09/602,110, Response filed Aug. 4, 2005 to Non Final Office Action mailed Apr. 5, 2005", 19 pgs.

"U.S. Appl. No. 09/905,525, Non-Final Office Action mailed Aug. 22, 2008", 18 pgs.
"U.S. Appl. No. 09/905,525, Final Office Action mailed Jan. 10, 2008", 15 pgs.
"U.S. Appl. No. 09/905,525, Response filed Mar. 27, 2008 to Final Office Action mailed Jan. 10, 2008", 17 pgs.
"U.S. Appl. No. 09/905,525, Response filed Jun. 10, 2008 to Final Office Action mailed Jan. 10, 2008", 20 pgs.
"U.S. Appl. No. 09/905,525, Response filed Sep. 25, 2007 to Non-Final Office Action mailed Jun. 25, 2007", 17 pgs.
"U.S. Appl. No. 09/905,525, Advisory Action mailed May 2, 2008", 5 pgs.
"U.S. Appl. No. 09/905,525, Final Office Action mailed Jun. 29, 2006", 14 pgs.
"U.S. Appl. No. 09/905,525, Non Final Office Action mailed Jun. 25, 2007", 16 pgs.
"U.S. Appl. No. 09/905,525, Non Final Office Action mailed Dec. 12, 2005", 12 pgs.
"U.S. Appl. No. 09/905,525, Non Final Office Action mailed Dec. 18, 2006", 15 pgs.
"U.S. Appl No. 09/905,525, Response filed Mar. 19, 2007 to Non Final Office Action mailed Dec. 18, 2006", 9 pgs.
"U.S. Appl. No. 09/905,525, Response filed Apr. 12, 2006 to Non Final Office Action mailed Dec. 12, 2005", 8 pgs.
"U.S. Appl. No. 09/905,525, Response filed Apr. 13, 2005 to Non Final Office Action mailed Dec. 14, 2004", 17 pgs.
"U.S. Appl. No. 09/905,525, Response filed Sep. 22, 2006 to Final Office Action mailed Jun. 29, 2006", 19 pgs.
"U.S. Appl. No. 09/905,525, Non Final Office Action mailed Dec. 14, 2004", 11 pgs.
"U.S. Appl. No. 10/252,126, Final Office Action mailed Feb. 26, 2008", 12 pgs.
"U.S. Appl. No. 10/252,126, Final Office Action mailed Jun. 27, 2006", 11 pgs.
"U.S. Appl. No. 10/252,126, Final Office Action mailed Sep. 4, 2008", 13 pgs.
"U.S. Appl. No. 10/252,126, Non Final Office Action mailed Jan. 30, 2007", 9 pgs.
"U.S. Appl. No. 10/252,126, Non Final Office Action mailed Feb. 3, 2006", 8 pgs.
"U.S. Appl. No. 10/252,126, Non Final Office Action mailed Aug. 20, 2007", 8 pgs.
"U.S. Appl. No. 10/252,126, Response filed May 3, 2006 to Non Final Office Action mailed Feb. 3, 2006", 7 pgs.
"U.S. Appl. No. 10/252,126, Response filed Jun. 25, 2007 to Non Final Office Action mailed Jan. 30, 2007", 11 pgs.
"U.S. Appl. No. 10/252,126, Response filed Dec. 20, 2007 to Non-Final Office Action mailed Aug. 20, 2007", 8 pgs.
"U.S. Appl. No. 10/252,127, Advisory Action mailed Oct. 10, 2007", 3 pgs.
"U.S. Appl. No. 10/252,127, Final Office Action mailed Jan. 11, 2008", 11 pgs.
"U.S. Appl. No. 10/252,127, Final Office Action mailed Sep. 4, 2008", 12 pgs.
"U.S. Appl. No. 10/252,127, Final Office Action mailed Oct. 6, 2006", 10 pgs.
"U.S. Appl. No. 10/252,127, Non Final Office Action mailed Mar. 21, 2006", 9 pgs.
"U.S. Appl. No. 10/252,127, Non Final Office Action mailed Jul. 11, 2007", 9 pgs.
"U.S. Appl. No. 10/252,127, Response filed Mar. 27, 2008 to Final Office Action mailed Jan. 11, 2008", 16 pgs.
"U.S. Appl. No. 10/252,127, Response filed Jun. 21, 2006 to Non Final Office Action mailed Mar. 21, 2006", 8 pgs.
"U.S. Appl. No. 10/252,127, Response filed Oct. 11, 2007 to Non-Final Office Action mailed Jul. 11, 2007", 15 pgs.
"U.S. Appl. No. 10/252,127, Response filed Dec. 6, 2006 to Final Office Action mailed Oct. 6, 2006", 14 pgs.
"U.S. Appl. No. 10/252,127, Response filed Jun. 12, 2008 to Final Office Action mailed Jan. 11, 2008", 16 pgs.
"U.S. Appl. No. 10/252,128, Non-Final Office Action mailed Mar. 21, 2008", 12 pgs.
"U.S. Appl. No. 10/252,128, Response filed Jul. 21, 2008 to Non-Final Office Action mailed Mar. 21, 2008", 11 pgs.
"U.S. Appl. No. 10/252,129, Response filed Apr. 14, 2008 to Non-Final Office Action mailed Jan. 14, 2008", 14 pgs.
"U.S. Appl. No. 10/252,129, Final Office Action mailed Sep. 15, 2008", 11 pgs.
"U.S. Appl. No. 10/252,129, Final Office Action mailed Dec. 27, 20306", 12 pgs.
"U.S. Appl. No. 10/252,129, Final Office Action mailed May 29, 2008", 9 pgs.
"U.S. Appl. No. 10/252,129, Non Final Office Action mailed May 15, 2007", 10 pgs.
"U.S. Appl. No. 10/252,129, Non Final Office Action mailed Aug. 18, 2006", 10 pgs.
"U.S. Appl. No. 10/252,129, Response filed Aug. 13, 2007 to Non-Final Office Action mailed May 15, 2007", 16 pgs.
"U.S. Appl. No. 10/252,129, Response filed Oct. 5, 2006 to Non Final Office Action mailed Aug. 18, 2006", 15 pgs.
"U.S. Appl. No. 10/252,129, Response filed Nov. 26, 2007 to Final Office Action mailed Oct. 5, 2007", 15 pgs.
"U.S. Appl. No. 10/252,129 Response filed Jul. 31, 2008 to Final Office Action mailed May 29, 2008", 14 pgs.
"U.S. Appl. No. 10/252,129, Non-Final Office Action mailed Jan. 14, 2008", 10 pgs.
"U.S. Appl. No. 10/252,129 Advisory Action mailed Mar. 13, 2007", 3 pgs.
"U.S. Appl. No. 10/252,129 Response filed Feb. 22, 2007 to Final Office Action mailed Dec. 27, 2006", 14 pgs.
"U.S. Appl. No. 10/252,126, Response filed Dec. 31, 2005 to Restriction Requirement mailed Oct. 31, 2005", 5 pgs.
"U.S. Appl. No. 10/252,126, Response filed Jul. 28, 2008 to Final Office Action mailed Feb. 26, 2008", 7 pgs.
"U.S. Appl. No. 10/252,126, Restriction Requirement mailed Oct. 31, 2005", 7 pgs.
"U.S. Appl. No. 10/831,421, Final Office Action mailed Jun. 13, 2008", 18 pgs.
"U.S. Appl. No. 10/831,421, Non-Final Office Action mailed Nov. 28, 2007", 12 pgs.
"U.S. Appl. No. 10/831,421, Response filed Feb. 28, 2008 to Non-Final Office Action mailed Nov. 28, 2007", 23 pgs.
"Blackthorne Products Page", http://web.archive.org/web/19990508065201/www.blackthornesw.com/Bthorne/products, (1999).
"Chinese Application Serial No. 02824589, First Office Action mailed Mar. 23, 2007", 31 pgs.
"Chinese Application Serial No. 02824589, Second Office Action mailed Dec. 28, 2007", 7 pgs.
"DHL and UPS offer country-specific services", *Transportation and distribution*, vol. 38, Iss. 12, (Dec. 1997), 18.
"European Application Serial No. 02723169.5, Supplementary European Search Report mailed Sep. 26, 2006", 3 pgs.
"Frequently Asked Questions about Mister Lister", http://pages.ebay.co.uk/help/sellerguide/mr-lister-faq.html, (Copyright 1995-2005).
"Google looking at more Country Specific Domains", *Europmedia*, (Jan. 17, 2002).
"International Application Serial No. 02723169.5, Office Action mailed Feb. 20, 2008", 6 pgs.
"Onsale Joins Fray as Online Shopping Picks Up Speed: Internet Booms", *Computer Reseller News*, CMP Publications, Inc., USA, (Jun. 5, 1995), 1.
"Onsale: Onsale Brings Thrill of Auctions and Bargain Hunting Online; Unique Internet retail service debuts with week-long charity auction for the Computer Museum in Boston", *Business Wire*, Dialog Web. 0489267 BW0022, (May 24, 1995), 3 pages.
"Photodisc localizes Internet presence to better serve global markets;Adds country-specific content and languages to its Award-wining Websites", *Business Wire*, (May 27, 1998), 3 pgs.
Alice, Michele, "eBay's 'Mister Lister' Auction Management Software", *Auctionbytes-Update*, No. 22, (Sep. 24, 2000).

ANDALE.COM, "Andale Lister" [Online]. [Archived Oct. 25, 2002]. Retrieved from the Internet: <URL: http://web.archive.org/web/20021025121452/http://www.andale.com/corp/products/sell.jsp>, 3 pgs.

ANDALE.COM, "Andale Lister: Bulk List", [Online]. [Archived Oct. 5, 2002]. Retrieved from the Internet: <URL: http://web.archive.org/web/20021005074745/http://www.andale.com/corp/products/qs_sell_details_bulklist.jsp>, 1 pg.

ANDALE.COM, "Andale lister: Design Center", [Online]. [Archieved Dec. 15, 2004]. Retrieved from the Internet: <URL: http://web.archive.org/web/20021215192044/http://www.andale.com.corp/products/qs_sell_details_designcenter.jsp>, 1 pg.

ANDALE.COM, "Andale Lister: In-Line Images", [Online]. [Archived Dec. 12, 2002]. Retrieved from the Internet: <URL: http://web.archive.org/web/20021215192408/http://www.andale.com/corp/products/qs_sell_details_inlineimg.jsp>, 1 pg.

ANDALE.COM, "Andale Lister: Inventory Dashboard", [Online]. [Archived Dec. 15, 2002]. Retrieved from the Internet: <URL: http://web.archive.org/web/20021215192408/http://www.andale.com/corp/products/qs_sell_details_invdashboard.jsp, 2 pgs.

ANDALE.COM, "Andale Lister: Launch Scheduler", [Online]. [Archived Dec. 15, 2002]. Retrieved from the Internet: <URL: http://web.archive.org/web/20021215192724/http://www.andale.com/corp/products/qs_sell_details_launchsched.jsp, 1 pg.

ANDALE.COM, "Andale Lister: Online or Offline", [Online]. [Archived Dec. 15, 2002]. Retrieved from the Internet: <URL: http://web.archive.org/web/20021215194722/http://www.andale.com/corp/products/qs_sell_details_onoffline.jsp> , 2 pgs.

ANDALE.COM, "Andale Lister: Overview", [Online]. [Archived Dec. 1, 2002]. Retrieved from the Internet: <URL: http://web.archive.org/web/20021201081906/http://www.andale.com/corp/products/qs_overview.jsp; 4 pgs.

AUCTIONWATCH.COM, et al., "", *AuctionWatch.com's Official Guide to Online Buying and Selling: Professional Tips, Tactics and Techniques at Your Fingertips.*, Prima Publishing, Roseville, CA. ISBN 0-7615-2999-3, (2000), 307 pgs.

BIDNBUY, "Going, going, virtually gone . . . ", *Business and Finance Dialog File* 20#06012646, (Jun. 17,1999), 3 pgs.

Business Wire, "Bay Builder Releases Major Innovation for Online Wireless Auctions.", *Recovered via Dialog Database* on Feb. 15, 2008, (Mar. 10, 2000).

Collete, Stacy, "Thin Clients Pull in Car Customers: Auto Auction company eyes move to Web.(Industry Trend or Event)", *Computerworld recovered via dialog database* on Feb. 15, 2008, (Apr. 5, 1999), p. 41(1).

Hansell, Saul, "Meg Whitman and eBay, Net Survivors", *New York Times*, (May 5, 2002).

Hauser, R, "Anonymous Delivery of Goods in Electronic Commerce", *IBM Technical Disclosure Bulletin*, 39(3), (Mar. 1996), 363-366.

Hutchinson, Art, "E-Commerce : Building a Model", *Art. Communications Week recovered via Dialog Database* on Feb. 15, 2008., (Mar. 17, 1997), p. 57.

Tak, Y., et al., "The SIFT Information Dissemination System", *ACM Transactions on Database Systems*. vol. 24, Issue 4. ACM Press, (Dec. 1999), 529-565.

Wikipedia, "Thin Client", [Online]. Retrieved from the Internet: <URL:http://en.wikipedia.org/wiki/Thin_client>, (Feb. 15, 2008), 13 pgs.

U.S. Appl. No. 09/602,110 Response filed Oct. 21, 2008 to Non-Final Office Action mailed Jul. 21, 2008, 19 pgs.

U.S. Appl. No. 09/602,110 Non-Final Office Action mailed Mar. 18, 2009, 3 pgs.

U.S. Appl. No. 09/905,525 Non-Final Office Action mailed Mar. 5, 2009, 25 pgs.

U.S. Appl. No. 09/905,525 Response filed Nov. 24, 2008 to Non-Final Office Action mailed Aug. 22, 2008, 17 pgs.

U.S. Appl. No. 10/252,127 Advisory Action mailed Jun. 1, 2008, 3 pgs.

U.S. Appl. No. 10/252,127 Response filed Nov. 4, 2008 to Final Office Action mailed Sep. 4, 2008, 22 pgs.

U.S. Appl. No. 10/252,129 Advisory Action mailed Nov. 26, 2008, 3 pgs.

U.S. Appl. No. 10/252,129 Final Office Action mailed Oct. 5, 2007, 10 pgs.

U.S. Appl. No. 10/252,129 Non-Final Office Action mailed Feb. 10, 2009, 11 pgs.

U.S. Appl. No. 10/252,129 Response filed Nov. 11, 2008 to Final Office Action mailed Sep. 15, 2008 14 pgs.

U.S. Appl. No. 10/252,129 Response filed Dec. 2, 2008 to Final Office Action mailed Sep. 15, 2008, 14 pgs.

U.S. Appl. No. 10/831,421 Response filed Oct. 10, 2008 to Final Office Action mailed Jun. 13, 2008, 20 pgs.

U.S. Appl. No. 10/831,421 Non-Final Office Action mailed Jan. 12, 2009, 20 pgs.

U.S. Appl. No. 09/602,110 Final Office Action Mailed on Nov. 17, 2008, 12 Pgs.

Lassila, Ora, "Web Metadata; A Matter of Semantics", *IEEE Internet Computing*, v2i4pg30 Proquest #1424143061, (1998), 15 pgs.

U.S. Appl. No. 09/602,110, Appeal Brief filed Dec. 15, 2006, 34 pgs.

U.S. Appl. No. 09/602,110, Appeal Decision mailed Feb. 28, 2008, 13 pgs.

U.S. Appl. No. 09/602,110, Decision on Pre-Appeal Brief mailed Aug. 15, 2006, 2 pgs.

U.S. Appl. No. 09/602,110, Pre-Appeal Brief filed Jun. 27, 2006, 4 pgs.

U.S. Appl. No. 09/602,110, Reply Brief mailed May 15, 2007, 2 pgs.

U.S. Appl. No. 09/602,110, Response filed Feb. 17, 2009 to Final Office Action mailed Nov. 17, 2008, 21 pgs.

U.S. Appl. No. 09/602,110, Response filed Jul. 20, 2009 to Non Final Office Action mailed Mar. 18, 2009, 21 pgs.

U.S. Appl. No. 09/602,110, Response to Examiner's Answer filed May 7, 2007, 11 pgs.

U.S. Appl. No. 09/905,525, Response filed Jun. 5, 2009 to Non Final Office Action mailed Mar. 5, 2009, 19 pgs.

U.S. Appl. No. 10/252,126, Appeal Brief filed Feb. 4, 2009, 22 pgs.

U.S. Appl. No. 10/252,126, Response filed Oct. 27, 2006 to Final Office Action mailed Jun. 27, 2006, 8 pgs.

U.S. Appl. No. 10/252,127, Decision on Pre-Appeal Brief mailed Feb. 11, 2009, 2 pgs.

U.S. Appl. No. 10/252,127, Decision on Pre-Appeal Brief mailed May 12, 2008, 3 pgs.

U.S. Appl. No. 10/252,127, Non-Final Office Action mailed Jun. 26, 2009, 14 pgs.

U.S. Appl. No. 10/252,127, Pre-Appeal Brief Request filed Jan. 5, 2009, 5 pgs.

U.S. Appl. No. 10/252,127, Pre-Appeal Brief Request mailed Apr. 10, 2008, 5 pgs.

U.S. Appl. No. 10/252,128, Final Office Action mailed Apr. 3, 2009, 27 pgs.

U.S. Appl. No. 10/252,128, Response filed Aug. 3, 2009 to Final Office Action mailed Apr. 3, 2009, 4 pgs.

U.S. Appl. No. 10/252,128, Response filed Dec. 23, 2008 to Restriction Requirement mailed Nov. 24, 2008, 10 pgs.

U.S. Appl. No. 10/252,128, Restriction Requirement mailed Nov. 24, 2008, 8 pgs.

U.S. Appl. No. 10/252,129, Response filed May 11, 2009 to Non Final Office Action mailed Feb. 10, 2009, 15 pgs.

U.S. Appl. No. 10/252,129, Response filed Aug. 16, 2009 to Final Office Action mailed Jun. 18, 2009, 19 pgs.

U.S. Appl. No. 10/831,421, Final Office Action mailed Jul. 9, 2009, 21 pgs.

U.S. Appl. No. 10/831,421, Response filed Apr. 13, 2009 to Non Final Office Action mailed Jan. 12, 2009, 18 pgs.

U.S. Appl. No. 10/252,129, Final Office Action mailed Jun. 18, 2009, 13 pgs.

* cited by examiner

|  62 | 64 |
| --- | --- |
| CONSTRUCT ID | CONSTRUCT |
| 0001<br>0002<br>⋮ | WHAT IS YOUR ADDRESS? |

STORED TRANSLATED CONSTRUCTS TABLE

| 72 | 74 | 76 |
| --- | --- | --- |
| CONSTRUCT ID | LANGUAGE ID | TRANSLATED CONSTRUCT |
| 0001<br>0001<br>0001<br>⋮ | FR<br>IT<br>ES | |

SYSTEM AND METHOD TO FACILITATE TRANSLATION OF COMMUNICATIONS BETWEEN ENTITIES OVER A NETWORK

FIELD OF THE INVENTION

The present invention relates generally to the field of network-based communications and, more specifically, to a system and method to facilitate translation of communications between entities over a network, such as the Internet.

BACKGROUND OF THE INVENTION

The explosive growth of the Internet as a publication and interactive communication platform has created an electronic environment that is changing the way business is transacted. As the Internet becomes increasingly accessible around the world, communications between users that utilize different spoken or written languages increase exponentially.

Several attempts have been made to facilitate such communications and to provide translation software packages residing on a computer and configured to translate text or voice communications from one language to another. Some of these translation software packages, however, can be expensive and can result in a financial burden for a user of such software packages. Furthermore, such software packages require considerable storage capacity to be available on the computer.

Another drawback of the translation software packages relates to their limited applicability. For example, current technology allows for translation of text through common text translation software installed on a computer. The translation may be accomplished in a variety of ways, one of which is direct word for word translation of the communication, which is imperfect and produces grammatically incorrect sentences in the translated language. Current technology also allows for limited translation of voice communications through speech recognition software installed on the computer. However, spoken language translation is mostly available in restricted domains, where the database of recognizable words is limited to a specific set of words.

SUMMARY OF THE INVENTION

A system and method to facilitate translation of communications between entities over a network are described. Multiple predetermined language constructs are communicated to a first entity as a first transmission over the network. Responsive to selection by the first entity of a language construct from the predetermined language constructs, a translated language construct corresponding to the selected language construct is identified. Finally, the translated language construct is communicated to a second entity as a second transmission over the network.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which:

FIG. 3A illustrates an exemplary stored constructs table.

FIG. 3B illustrates an exemplary stored translated constructs table.

DETAILED DESCRIPTION

A system and method to facilitate translation of communication between entities over a network are described. In the following detailed description of embodiments of the invention, reference is made to the accompanying drawings in which like references indicate similar elements, and in which are shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
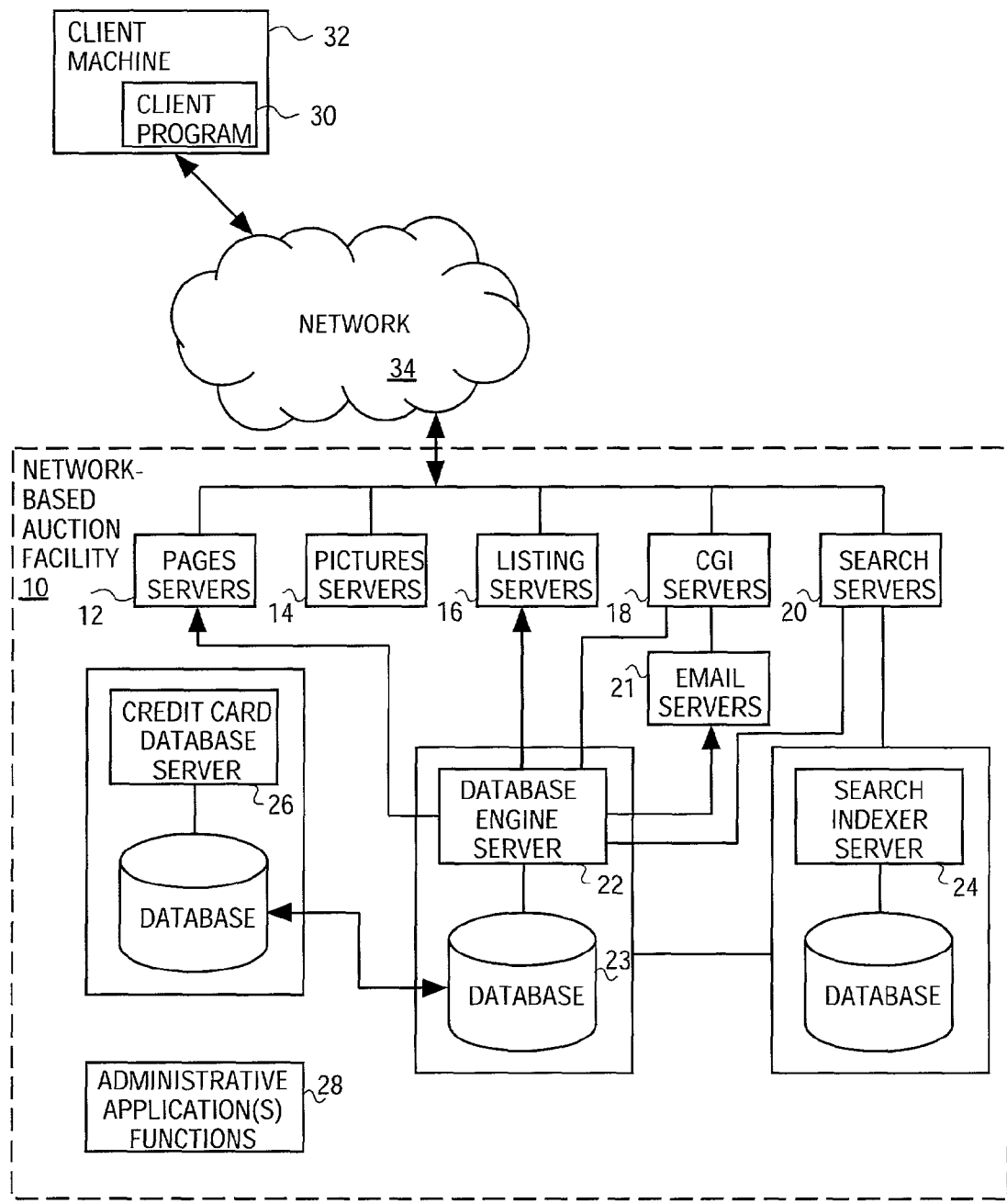
FIG. 1 is a block diagram illustrating an exemplary network-based transaction facility in the form of a network-based auction facility.

FIG. 1 is a block diagram illustrating an exemplary network-based transaction facility in the form of a network-based auction facility 10. While an exemplary embodiment of the present invention is described within the context of an auction facility, it will be appreciated by those skilled in the art that the invention will find application in many different types of computer-based, and network-based, commerce facilities.

The auction facility 10 includes one or more of a number of types of front-end servers, namely communications servers in the exemplary form of page servers 12 that deliver web pages to multiple entities (e.g., markup language documents), picture servers 14 that dynamically deliver images to be displayed within the web pages, listing servers 16, processing servers in the exemplary form of Common Gateway Interface (CGI) or Internet Server Application Program Interface (ISAPI) servers 18 that provide an intelligent interface to the back-end of the auction facility 10, and search servers 20 that handle search requests to the auction facility 10. In addition, the auction facility 10 includes e-mail servers 21 that provide, inter alia, automated e-mail communications to/from entities of the facility 10.

The auction facility 10 further includes one or more backend servers, for example a database engine server 22, a search indexer server 24 and a credit card database server 26, each of which maintains and facilitates access to a respective database 23. The network-based auction facility 10, such as an Internet-based auction facility 10, may be accessed by a client program 30, such as a browser (e.g., the Internet Explorer browser distributed by Microsoft Corporation of Redmond, Wash.) that executes on a client machine 32 and accesses the facility 10 via a network 34, such as, for example, the Internet. Other examples of networks that a client may utilize to access the auction facility 10 includes a wide area network (WAN), a local area network (LAN), a wireless network (e.g., a cellular network), or the Plain Old Telephone Service (POTS) network.

Figure 2:
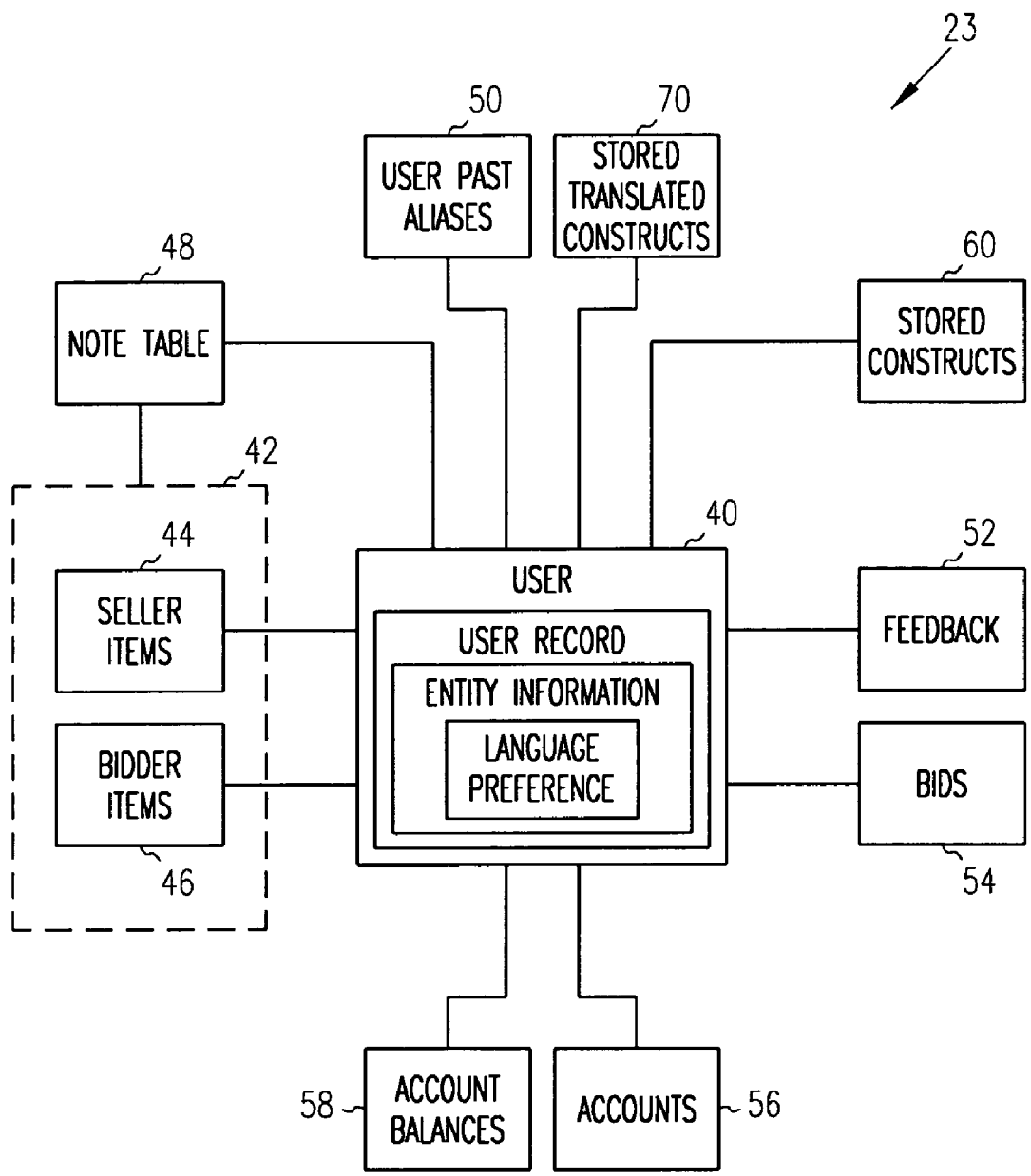
FIG. 2 is a block diagram illustrating an exemplary database, maintained by and accessed via a database engine server, which at least partially implements and supports the auction facility.

FIG. 2 is a block diagram illustrating an exemplary database 23, maintained by and accessed via the database engine server 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as a collection of objects in an object-oriented database.

Central to the database 23 shown in FIG. 2 is a user table 40, which contains a record for each entity or user of the auction facility 10. The record is shown to include entity information or user information that may further include a language preference. Each user may operate as a seller, a buyer, or both, within the auction facility 10. The database 23 also includes items tables 42 that may be linked to the user table 40. Specifically, the table 42 includes a seller items table 44 and a bidder items table 46. A user record in the user table 40 may be linked to multiple items that are being, or have been, auctioned via the auction facility 10. A link indicates whether the user is a seller or a bidder (or buyer) with respect to items for which records exist within the items table 42.

The database 23 further includes a note table 48 populated with note records that may be linked to one or more item records within the items table 42 and/or to one or more user records within the user table 40. Each note record within the note table 48 may include, inter alia, a comment, description, history, or other information pertaining to an item being auctioned via the auction facility 10, or pertaining to a user of the auction facility 10.

A number of other tables are also shown to be linked to the user table 40, such as a user past aliases table 50, a feedback table 52, a bids table 54, an accounts table 56, and an account balances table 58.

The database 23 is also shown to include two tables specifically to enable an exemplary embodiment of the present invention. A stored construct table 60 stores a predetermined number of language constructs, such as sentences, phrases, questions, or any other known types of language constructs. A stored translated construct table 70 contains a number of records, each record storing translated language constructs corresponding to the language constructs stored in table 60. Prior to any communication between client 32 and the network-based auction facility 10, each translated language construct is generated and stored in the stored translated construct table 70, and the correspondence to one or more predetermined language constructs in the stored language constructs table 60 is defined, such that each translated language construct includes a predetermined translation of the corresponding predetermined language construct.

FIG. 3A illustrates an exemplary embodiment of a stored construct table 60. As illustrated in FIG. 3A, the table 60 includes a construct ID field 62 to store a unique identifier for each stored language construct to be used in an exemplary embodiment of the present invention. The table 60 further includes a construct field 64 to store each language construct maintained within the database 23.

FIG. 3B illustrates an exemplary embodiment of a stored translated construct table 70. As illustrated in FIG. 3B, the table 70 includes a construct ID field 72 to store a unique identifier for each translated language construct, which corresponds to the identifier of the language construct stored within field 62. The table 70 further includes a language ID field 74 to store an identifier for a language pertaining to the translated construct, and a translated construct field 76 to store the translated construct in the particular language identified in the language ID field 74.

Figure 4:
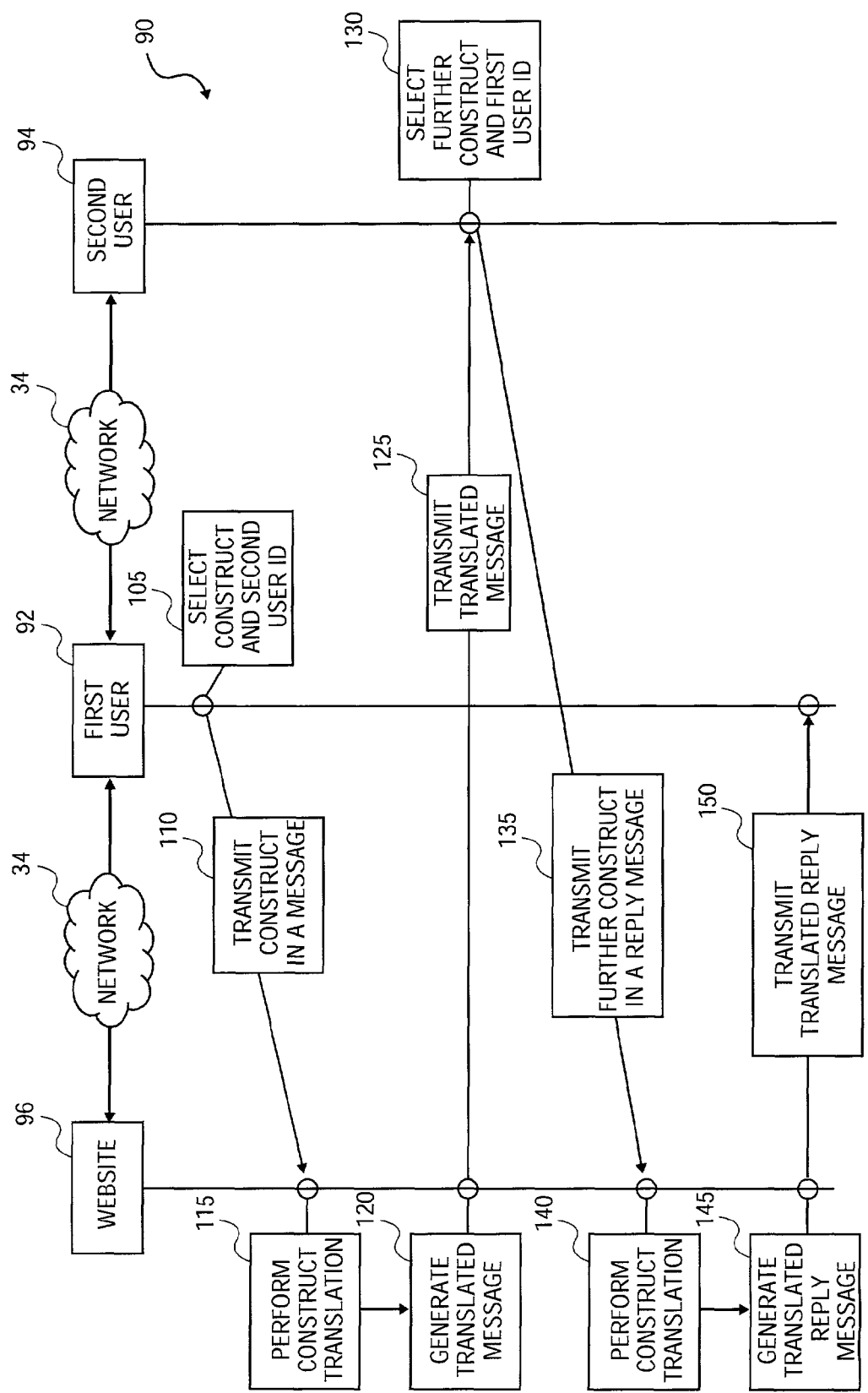
FIG. 4 is an interaction diagram illustrating a sequence of interactions, according to an exemplary embodiment of the present invention, to facilitate translation of communications between entities over a network.

FIG. 4 is an interaction diagram illustrating a sequence 90 of interactions, according to an exemplary embodiment of the present invention, to facilitate translation of communications between entities in the exemplary form of a first user 92 and a second user 94. While the sequence 90 describes a client-server environment, whereby communications between the first and second users 92 and 94 are facilitated by, or performed through, a website 96, it will also be appreciated that the teachings of the present inventions may be applied to a peer-to-peer environment, whereby the users 92 and 94 communicate directly and not through the website 96.

As illustrated in FIG. 4, the sequence 90 commences at block 105 with the selection by the first user 92 of a language construct and of a user identifier of the second user 94. The language construct may be selected, in one embodiment, from a drop-down list containing multiple predetermined language constructs, the drop-down list being displayed in a first interactive area of a web form communicated to the first user 92 from the website 96. Alternatively, the language construct may be selected from a window, which presents the web form containing the predetermined language constructs to the first user 92. The predetermined language constructs are generated and stored in the stored constructs table 60 of the database 23 prior to being communicated to the first user 92 in the drop-down list or web form.

At block 110, the language construct is communicated from the first user 92 to the website 96 via the network 34 in a message directed to the second user 94, for example an electronic mail (e-mail) message.

At block 115, the website 96 (e.g., the auction facility 10) utilizes the search servers 20 to conduct a search of the user table 40, the stored constructs table 60, and the stored translated constructs table 70 to retrieve a translated language construct, based on the user identifier corresponding to the second user 94. The search of the user table 40 locates the user information pertaining to the second user 94, including a language preference of the second user 94, and the search of the tables 60 and 70 locates the translated language construct corresponding to the selected language construct and the language preference of the second user 94. In one embodiment, the predetermined language constructs and the translated language constructs are generated and stored in respective tables 60 and 70 prior to the language constructs being communicated to the first user 92, so as to define a correspondence between each predetermined language construct and at least one associated translated language construct. Alternatively, the storing is so as to define a correspondence between a set of the translated language constructs, wherein each translated language construct of the set includes a predetermined translation of a common underlying language construct.

At block 120, the website 96 generates a translated message to be transmitted to the second user 94. In one embodiment, the translated message is an e-mail message generated by the e-mail servers 21 and directed to the second user 94, which contains the translated language construct. Alternatively, the translated e-mail message may contain multiple interactive fields to allow the second user 94 to respond to the first user 92.

At block 125, the translated message is communicated to the second user 94. In one embodiment, an e-mail message containing the translated language construct is communicated by the e-mail servers 21 to the second user 94.

Figure 8:
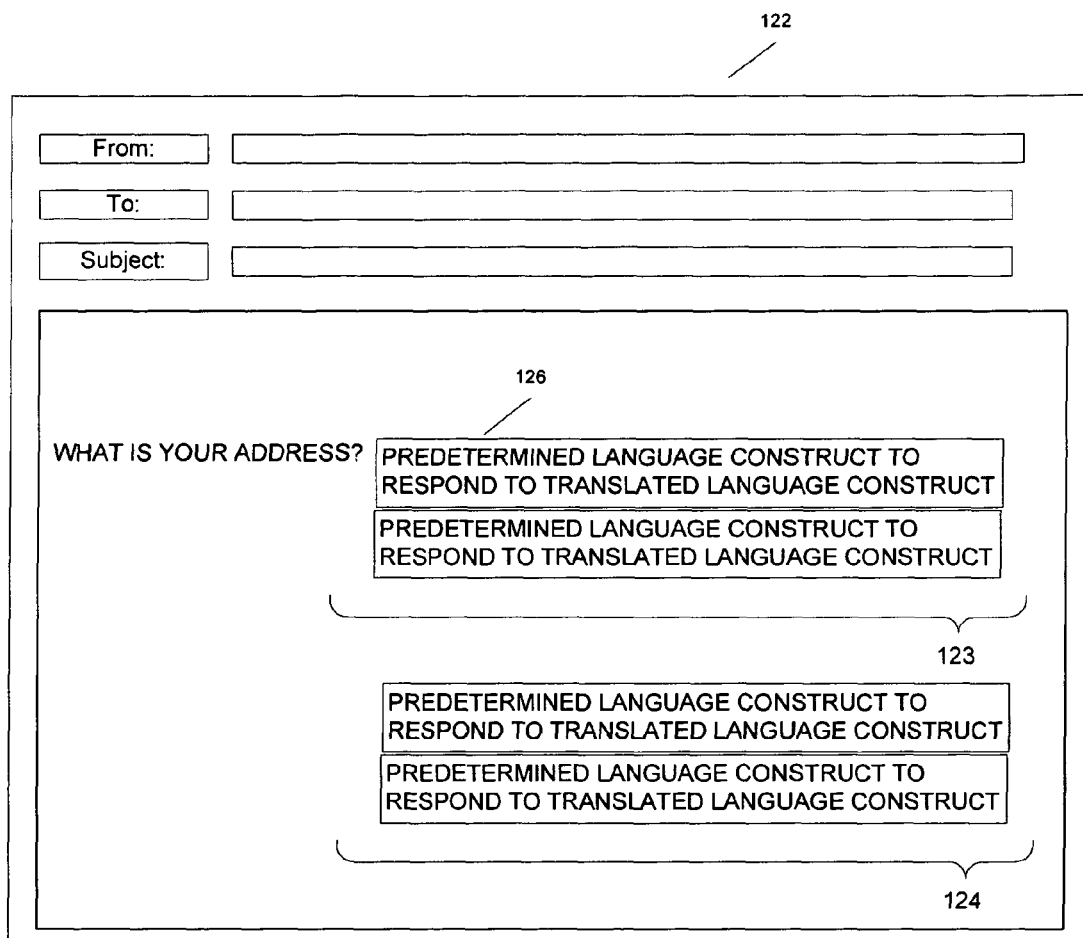
FIG. 8 is a diagram illustrating an e-mail message, according to an embodiment, that includes multiple interactive fields.

At block 130, the second user 94 selects a further language construct and a user identifier of the first user 92 to which the further language construct is to be communicated. The further language construct may be selected, in one embodiment, from the drop-down list containing multiple predetermined language constructs translated in the language preference of the second user 94, the drop-down list being displayed in one interactive field of the multiple fields communicated to the second user 94 from the website 96. For example, the FIG. 8 is a diagram illustrating an e-mail message 122, according to an embodiment, that includes multiple interactive fields 123, 124. The interactive field 123 is shown to include a drop-down list 126 that may contain multiple predetermined language constructs translated in the language preference of the second user 94 to allow the second user 94 to respond to the translated language construct (WHAT IS YOUR ADDRESS?) from the first user 92. Alternatively, the second user 94 may only receive the translated message from the website 96 and take no further action.

Figure 9:
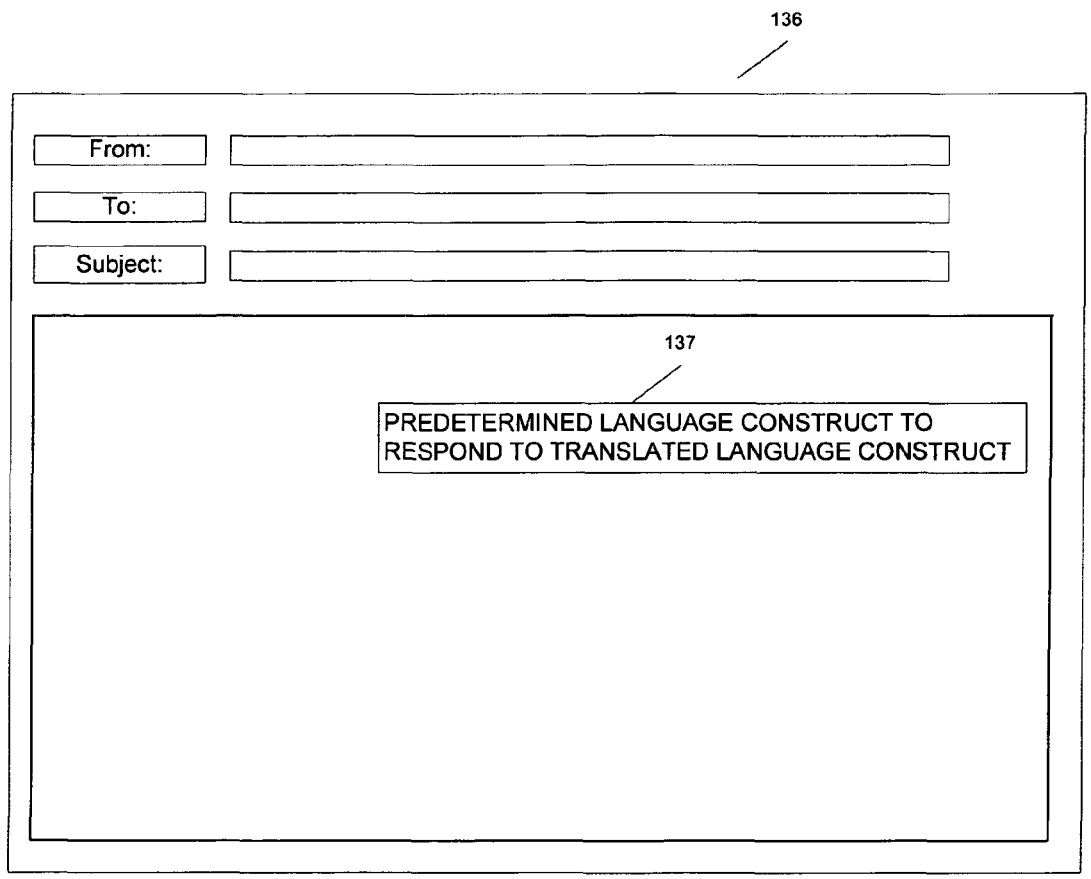
FIG. 9 illustrates a reply message, according to one embodiment.

At block 135, the further language construct is communicated from the second user 94 to the website 96 via the network 34 in a reply message directed to the first user 92, for example an electronic mail (e-mail) message. FIG. 9 illustrates a reply message 136, according to one embodiment. The reply message 136 is shown to include a language construct 137 selected by the second user 94 in response to the translated language construct from the first user 92.

Returning to FIG. 5, at block 140, the website 96 (e.g., the auction facility 10) utilizes the search servers 20 to conduct a search of the user table 40, the stored constructs table 60, and the stored translated constructs table 70 to retrieve a translated further language construct, based on the user identifier corresponding to the first user 92. The search of the user table 40 locates the user information pertaining to the first user 92, including a language preference of the first user 92, and the search of the tables 60 and 70 locates the translated further language construct corresponding to the selected further language construct and the language preference of the first user 92.

At block 145, the website 96 generates a translated reply message to be transmitted to the first user 92. In one embodiment, the translated reply message is an e-mail message generated by the e-mail servers 21 and directed to the first user 92, which contains the translated further language construct.

At block 150, the translated reply message is communicated to the first user 92. In one embodiment, an e-mail message containing the translated further language construct is communicated by the e-mail servers 21 to the first user 92.

It should be noted that the sequence 90 may have any one of a number of applications and may be implemented within any number of environments. For example, the sequence 90 may be used to communicate information from any one entity, such as first or second users 92 and 94, to the website 96 in a language preferred by the respective entity. The website 96 may subsequently translate the information and use it in any one of a number of applications, such as in the preparation of item listings, or in the updating of the user information.

Figure 5:
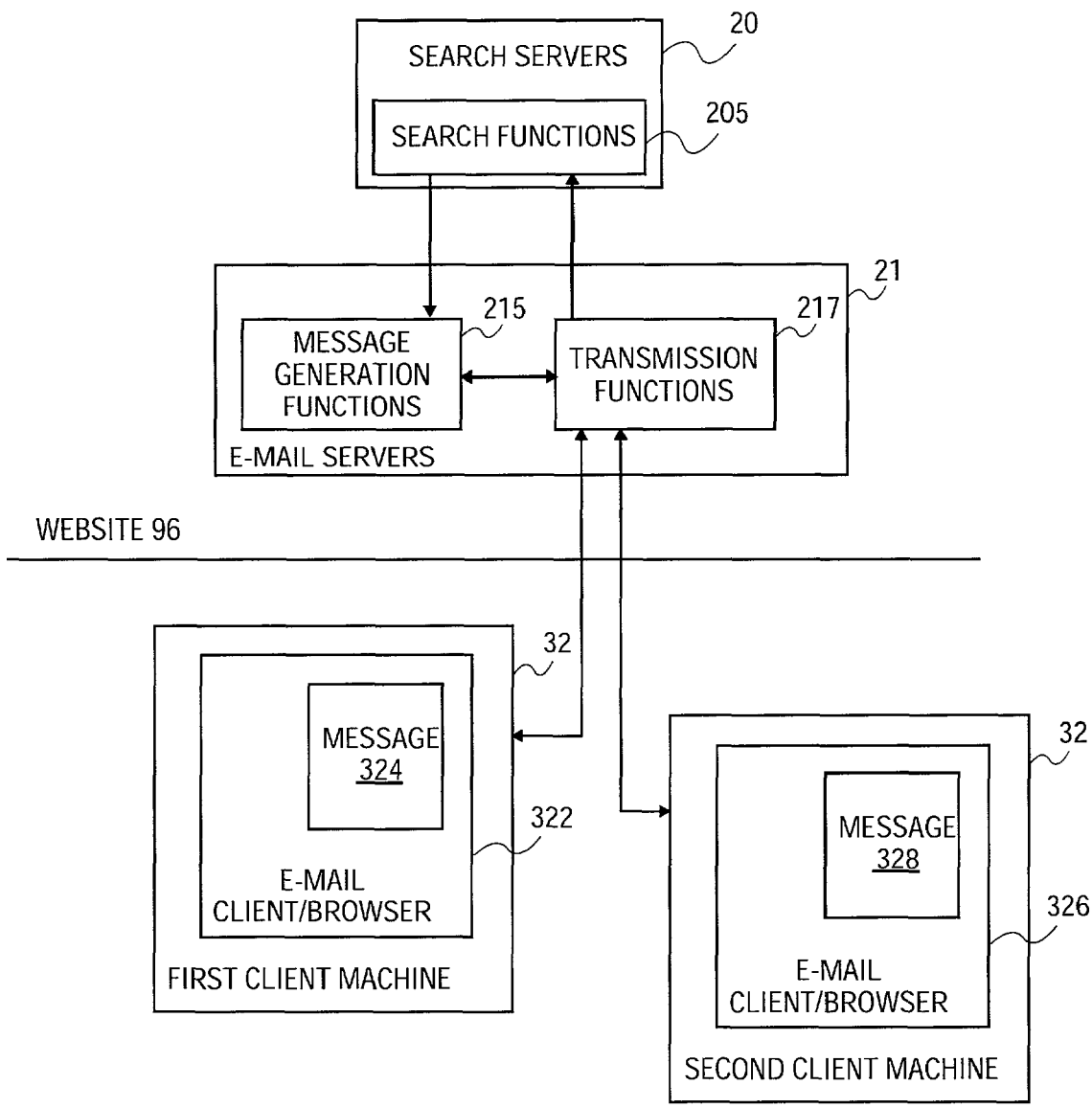
FIG. 5 is a block diagram illustrating an exemplary environment in which the interaction sequence illustrated in FIG. 4 may be employed.

FIG. 5 is a block diagram illustrating an exemplary environment in which the interaction sequence 90 may be employed. As illustrated in FIG. 5, client machines 32 are shown to reside outside the context of a website, such as the exemplary website 96 shown in FIG. 4. Accordingly, this embodiment describes an application which allows a first user of a client machine 32, such as the first client machine 32, to communicate language constructs to a second user of a further client machine 32, such as the second client machine 32, both of which reside outside the website 96 or any other commerce facility. Alternatively, each user of the client machines 32 may only communicate language constructs to the website 96 in order to request performance of applications by the website 96.

Referring to FIG. 5, the first user selects a language construct and a user identifier of the second user in an e-mail client or browser 322 that executes in the first client machine 32, the second user being the recipient of an e-mail message 324 containing the language construct to be communicated by the first user. The language construct may be selected, in one embodiment, from a drop-down list containing multiple predetermined language constructs, the drop-down list being displayed in a first interactive area of a web form communicated to the first user from the website 96. Alternatively, the language construct may be selected from a window, which presents the web form containing the predetermined language constructs to the first user.

The message is shown to be communicated to the e-mail servers 21 of the website 96. Specifically, the message containing the language construct may be communicated, in one embodiment, as an e-mail message or by utilizing any other transfer protocol or communication. The e-mail servers 21 receive the message using the transmission functions 217 and proceed to parse the message to extract the language construct and the user identifier for the second user that operates the second client machine 32.

The search servers 20 within the website 96 receive the language construct and the user identifier and search tables within corresponding databases using search functions 205 to provide a translated language construct to be communicated to the second user. Specifically, in one embodiment, the search servers 20 search the user table 40 shown in FIG. 2 to locate user information pertaining to the second user, including a language preference of the second user. The search servers 20 further search the stored constructs table 60 and the stored translated constructs table 70 shown in FIG. 2 to locate the translated language construct corresponding to the selected language construct and the language preference of the second user.

The translated language construct is subsequently communicated to the e-mail servers 21. The e-mail servers 21 generate a translated e-mail message containing the translated language construct using message generation functions 215. The translated e-mail message is then communicated to the second client machine via the transmission functions 217.

In one embodiment, the second user selects a further language construct and a user identifier of the first user in an e-mail client or browser 326 that executes in the second client machine 32, the first user being the recipient of a reply e-mail message 328 containing the further language construct to be communicated by the second user. The language construct may be selected, in one embodiment, from a drop-down list containing multiple predetermined language constructs translated in the language preference of the second user, the drop-down list being displayed in one interactive field of multiple interactive fields that may be communicated to the second user from the website 96. Alternatively, the second user may only receive the translated e-mail message and take no further action.

The reply message is shown to be communicated to the e-mail servers 21 of the website 96. Specifically, the reply message containing the further language construct may be communicated, in one embodiment, as an e-mail message or by utilizing any other transfer protocol or communication. The e-mail servers 21 receive the reply message using the transmission functions 217 and proceed to parse the reply message to extract the further language construct and the user identifier for the first user that operates the first client machine 32.

The search servers 20 within the website 96 receive the further language construct and the user identifier and search tables within corresponding databases using search functions 205 to provide a translated further language construct to be communicated to the first user. Specifically, in one embodiment, the search servers 20 search the user table 40 shown in FIG. 2 to locate user information pertaining to the first user, including a language preference of the first user. The search servers 20 further search the stored constructs table 60 and the stored translated constructs table 70 shown in FIG. 2 to locate the translated further language construct corresponding to the selected further language construct and the language preference of the first user.

The translated further language construct is subsequently communicated to the e-mail servers 21. The e-mail servers 21 generate a translated reply message containing the translated further language construct using message generation functions 215. The translated reply message is then communicated to the first client machine via the transmission functions 217.

An alternative application would allow each user of the first or second client machines 32 to communicate selected language constructs to the website 96. In this case, the website 96 may perform search and translation operations and use the translated language construct to update listings via listing servers 16, or to update user information in the user table 40.

Figure 6:
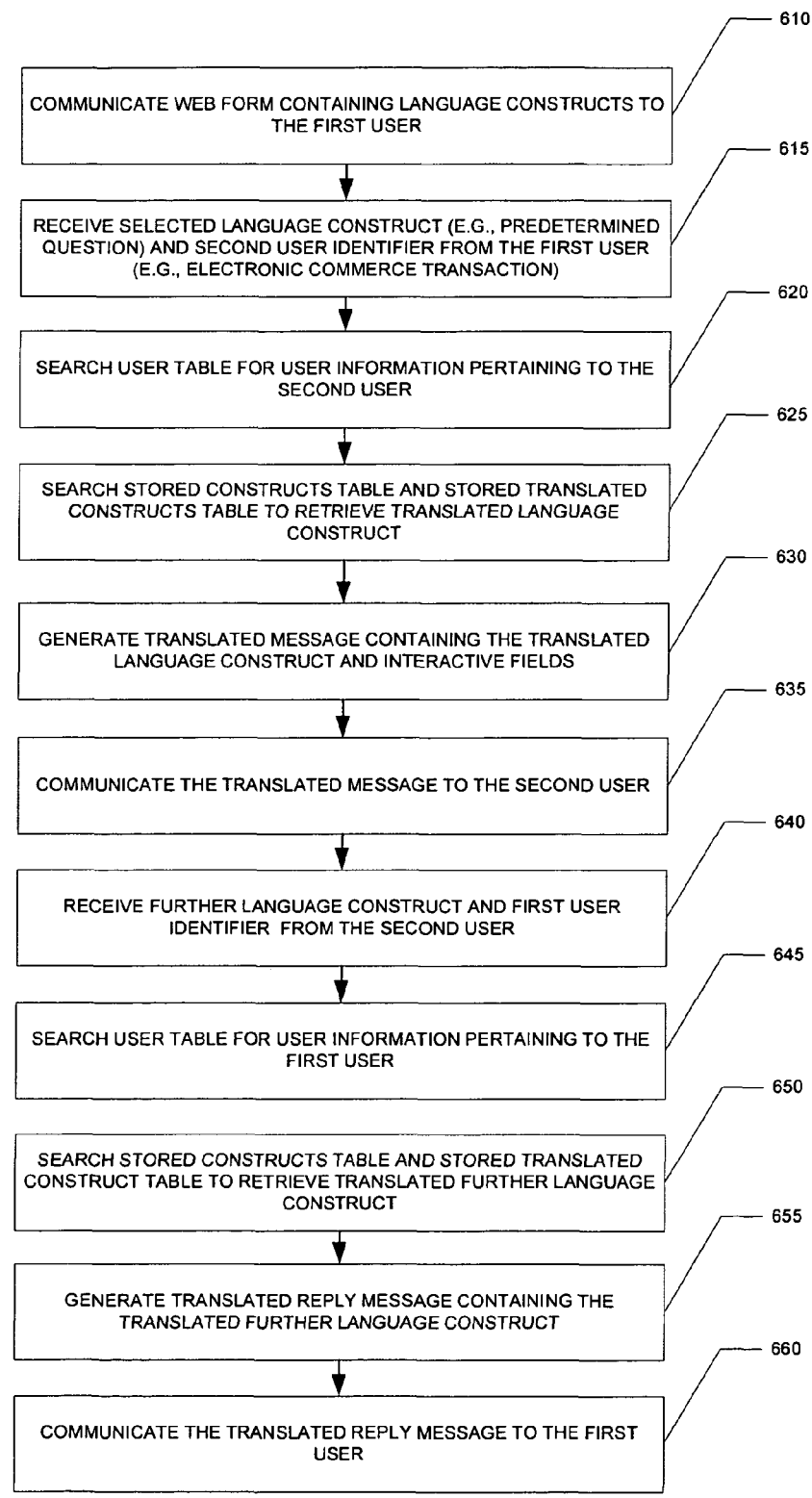
FIG. 6 is a flow chart illustrating a method, according to an exemplary embodiment of the present invention, to facilitate translation of communications between entities over a network.

FIG. 6 is a flow chart illustrating a method, according to an exemplary embodiment of the present invention, to facilitate translation of communications between entities over a network. It will be appreciated that the method may, as described above, be utilized to facilitate translation of communications, and is not limited to the context of a network-based auction facility.

As illustrated in FIG. 6, at processing block 610, a web form containing language constructs is communicated to the first user. At processing block 615, a selected language construct and a user identifier of the second user are received from the first user.

At processing block 620, the user table 40 is searched to locate user information pertaining to the second user, including a language preference of the second user. At processing block 625, the stored constructs table 60 and the stored translated constructs table 70 are searched to retrieve a translated language construct corresponding to the selected language construct.

At processing block 630, a translated message containing the translated language construct and multiple interactive fields is generated. At processing block 635, the translated message is communicated to the second user.

At processing block 640, a further language construct and a user identifier of the first user are received from the second user. At processing block 645, the user table 40 is searched to locate user information pertaining to the first user, including a language preference of the first user. At processing block 650, the stored constructs table 60 and the stored translated constructs table 70 are searched to retrieve a translated further language construct corresponding to the selected further language construct.

At processing block 655, a translated reply message containing the translated further language construct is generated. Finally, at processing block 660, the translated reply message is communicated to the first user.

Figure 7:
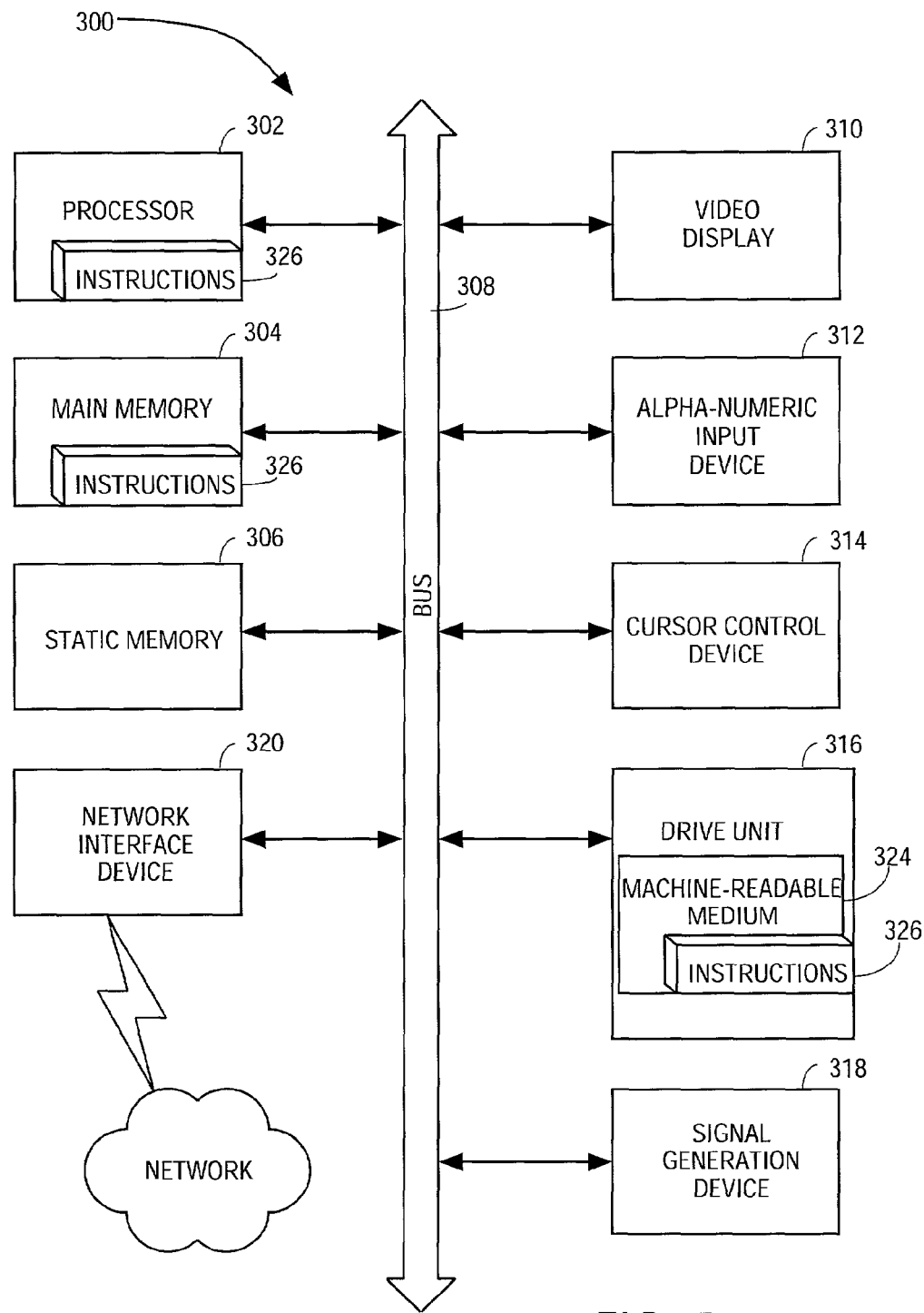
FIG. 7 is a diagrammatic representation of a machine in the exemplary form of a computer system within which a set of instructions may be executed.

FIG. 7 shows a diagrammatic representation of a machine in the exemplary form of a computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 18 (e.g., a speaker), and a network interface device 320.

The disk drive unit 316 includes a machine-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 320.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method to facilitate translation of communications between hardware entities over a network, said method comprising:

communicating a plurality of predetermined language constructs in a first language to a first entity as a first transmission over said network, the plurality of predetermined language constructs in the first language displayed to the first entity in a first set of one or more interactive fields, each predetermined language construct of the plurality of language constructs in the first language being associated with a predetermined numerical identifier;

receiving, from said first entity, an identifier of a second entity;

receiving, from said first entity, a first numerical identifier of a first language construct selected by the first entity from said plurality of predetermined language constructs in the first language, the first numerical identifier comprising a numerical indicator of the first language construct and not including the text of the first language construct;

responsive to receipt of said first numerical identifier, determining a translated language construct corresponding to said first numerical identifier, said determining further comprises:

retrieving entity information relating to said second entity based on the identifier of said second entity; and retrieving said translated language construct from a table based on said entity information and said first numerical identifier of the first language construct;

communicating said translated language construct to said second entity as a second transmission over said network; and communicating the plurality of predetermined language constructs in a second language to the second entity in a second set of one or more interactive fields, the second entity to respond to the first entity by selecting a second language construct from the plurality of predetermined language constructs in the second language, each predetermined language construct of the plurality of language constructs in the second language being associated with the predetermined numerical identifier.

2. The method according to claim 1, wherein said entity information further comprises a language preference of said second entity.

3. The method according to claim 1, wherein said first language construct is a predetermined question that is asked by said first entity in an electronic commerce transaction over said network.

4. The method of claim 3, wherein said predetermined question is translated responsive to said selection of said first entity by retrieving said translated language construct from a table that includes a plurality translated language constructs of said predetermined question that are respectively translated into different languages.

5. The method of claim 4, wherein the second transmission includes a plurality of interactive fields to allow said second entity to respond to said predetermined question that is asked by said first entity.

6. The method of claim 5, wherein said plurality of interactive fields includes a first interactive field, wherein said first interactive field includes a drop down list that contains a second plurality of predetermined language constructs that respectively respond to said predetermined question and are respectively translated into a second language based on a language preference of said second entity.

7. The method of claim 6, further including receiving a reply message from said second entity that includes a selection of the said second entity from said first interactive field, said selection of the second entity including a response from said second entity to said predetermined question that is asked by said first entity.

8. The method according to claim 1, wherein said first transmission is a Hyper Text Markup Language (HTTP) message.

9. The method according to claim 1, wherein said second transmission is an electronic mail message.

10. The method according to claim 1, wherein said identifier of said second entity is an electronic mail address of said second entity.

11. The method according to claim 1, further comprising, at a network-based transaction facility, storing said plurality of predetermined language constructs in the first language and an associated plurality of translated language constructs so as to define a correspondence between each language construct of said plurality of predetermined language constructs in the first language and at least one associated translated language construct of said plurality of translated language constructs.

12. The method according to claim 11, wherein said storing is so as to define a correspondence between a set of said plurality of translated language constructs, each translated language construct of said set comprising a predetermined translation of a common underlying language construct.

13. A machine-readable medium storing executable instructions, which, when executed in a processing system, cause said processing system to perform a method to facilitate translation of communications between entities over a network, said method comprising:

communicating a plurality of predetermined language constructs in a first language to a first entity as a first transmission over said network, the plurality of predetermined language constructs in the first language displayed to the first entity in a first set of one or more interactive fields, each predetermined language construct of the plurality of language constructs in the first language being associated with a predetermined numerical identifier;

receiving, from said first entity, an identifier of a second entity;

receiving, from said first entity, a first numerical identifier of a first language construct selected by the first entity from said plurality of predetermined language constructs in the first language, the first numerical identifier comprising a numerical indicator of the first language construct and not including the text of the first language construct;

responsive to receipt of said first numerical identifier, determining a translated language construct corresponding to said first numerical identifier, said determining further comprises:

retrieving entity information relating to said second entity based on the identifier of said second entity; and retrieving said translated language construct from a table based on said entity information and said first numerical identifier of the first language construct;

communicating said translated language construct to said second entity as a second transmission over said network; and communicating the plurality of predetermined language constructs in a second language to the second entity in a second set of one or more interactive fields, the second entity to respond to the first entity by selecting a second language construct from the plurality of predetermined language constructs in the second language, each predetermined language construct of the plurality of language constructs in the second language being associated with the predetermined numerical identifier.

14. The machine readable medium according to claim 13, wherein said entity information further comprises a language preference of said second entity.

15. The machine readable medium according to claim 13, wherein said first language construct is a predetermined question that is asked by said first entity in an electronic commerce transaction over said network.

16. The machine readable medium according to claim 13, wherein said first transmission is a Hyper Text Markup Language (HTTP) message.

17. The machine readable medium according to claim 13, wherein said second transmission is an electronic mail message.

18. The machine readable medium according to claim 13, wherein said identifier of said second entity is an electronic mail address of said second entity.

19. The machine readable medium according to claim 13, wherein said method further comprises, at a network-based transaction facility, storing said plurality of predetermined language constructs in the first language and an associated plurality of translated language constructs so as to define a correspondence between each language construct of said plurality of predetermined language constructs in the first language and at least one associated translated language construct of said plurality of translated language constructs.

20. The machine readable medium according to claim 13, wherein said storing is so as to define a correspondence between a set of said plurality of translated language constructs, each translated language construct of said set comprising a predetermined translation of a common underlying language construct.

21. A hardware system to facilitate translation of communications between entities over a network, said system comprising:
   means for communicating a plurality of predetermined language constructs in a first language to a first entity as a first transmission over said network, the plurality of predetermined language constructs in the first language displayed to the first entity in a first set of one or more interactive fields, each predetermined language construct of the plurality of language constructs in the first language being associated with a predetermined numerical identifier;
   means for receiving, from said first entity, an identifier of a second entity;
   means for receiving, from said first entity, a first numerical identifier of a first language construct selected by the first entity from said plurality of predetermined language constructs in the first language, the first numerical identifier comprising a numerical indicator of the first language construct and not including the text of the first language construct;
   means for determining a translated language construct corresponding to said first numerical identifier, said determining responsive to receipt of said first numerical identifier, said determining further comprises:
   retrieving entity information relating to said second entity based on the identifier of said second entity; and
   retrieving said translated language construct from a table based on said entity information and said first numerical identifier of the first language construct;
   means for communicating said translated language construct to said second entity as a second transmission over said network; and
   means for communicating the plurality of predetermined language constructs in a second language to the second entity in a second set of one or more interactive fields, the second entity to respond to the first entity by selecting a second language construct from the plurality of predetermined language constructs in the second language, each predetermined language construct of the plurality of language constructs in the second language being associated with the predetermined numerical identifier.

22. The system according to claim 21, wherein said entity information further comprises a language preference of said second entity.

23. The system according to claim 21, wherein said first language construct is a predetermined question that is asked by said first entity in an electronic commerce transaction over said network.

24. The system according to claim 21, wherein said first transmission is a Hyper Text Markup Language (HTTP) message.

25. The system according to claim 21, wherein said second transmission is an electronic mail message.

26. The system according to claim 21, wherein said identifier of said second entity is an electronic mail address of said second entity.

27. The system according to claim 21, further comprising, at a network-based transaction facility, means for storing said plurality of predetermined language constructs in the first language and an associated plurality of translated language constructs so as to define a correspondence between each language construct of said plurality of predetermined language constructs in the first language and at least one associated translated language construct of said plurality of translated language constructs.

28. The system according to claim 27, wherein said storing is so as to define a correspondence between a set of said plurality of translated language constructs, each translated language construct of said set comprising a predetermined translation of a common underlying language construct.

29. A system to facilitate translation of communications between entities over a network, said system comprising:
   a communications server to
      communicate a plurality of predetermined language constructs in a first language to a first entity as a first transmission over said network, the plurality of predetermined language constructs in the first language displayed to the first entity in a first set of one or more interactive fields, each predetermined language construct of the plurality of language constructs in the first language being associated with a predetermined numerical identifier, and
      receive, from said first entity, an identifier of a second entity and a first numerical identifier of a first language construct selected by the first entity from said plurality of predetermined language constructs in the first language, the first numerical identifier comprising a numerical indicator of the first language construct and not including the text of the first language construct; and
   a processing server to determine a translated language construct corresponding to said first numerical identifier, said processing server to determine responsive to a receipt of said first numerical identifier, said processing server to determine the translated language construct further comprises:
      said processing server to retrieve entity information relating to said second entity based on the identifier of said second entity,
      said processing server to retrieve said translated language construct from a table based on said entity information and said first numerical identifier of the first language construct;

said communication server further to communicate said translated language construct and the plurality of predetermined language constructs in a second language in a second set of one or more interactive fields to said second entity as a second transmission over said network, the second entity to respond to the first entity by selecting a second language construct from the plurality of predetermined language constructs in the second language, each predetermined language construct of the plurality of language constructs in the second language being associated with the predetermined numerical identifier.

30. The system according to claim 29, wherein said entity information further comprises a language preference of said second entity.

31. The system according to claim 29, wherein said first language construct is a predetermined question that is asked by said first entity in an electronic commerce transaction over said network.

32. The system according to claim 29, wherein said first transmission is a Hyper Text Markup Language (HTTP) message.

33. The system according to claim 29, wherein said second transmission is an electronic mail message.

34. The system according to claim 29, wherein said identifier of said second entity is an electronic mail address of said second entity.

35. The system according to claim 29, wherein, at a network-based transaction facility, said processing server further stores said plurality of predetermined language constructs in the first language and an associated plurality of translated language constructs so as to define a correspondence between each language construct of said plurality of predetermined language constructs in the first language and at least one associated translated language construct of said plurality of translated language constructs.

36. The system according to claim 35, wherein said storing by said processing server is so as to define a correspondence between a set of said plurality of translated language constructs, each translated language construct of said set comprising a predetermined translation of a common underlying language construct.

* * * * *